(12) United States Patent
Li et al.

(10) Patent No.: US 10,880,693 B2
(45) Date of Patent: Dec. 29, 2020

(54) INFORMATION TRANSMISSION METHOD AND DEVICE

(71) Applicant: HUAWEI TECHNOLOGIES CO., LTD., Guangdong (CN)

(72) Inventors: Chenwan Li, Beijing (CN); Yinghui Yu, Beijing (CN); Jiantao Xue, Beijing (CN); Yan Wang, Beijing (CN); Li Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/379,958

(22) Filed: Apr. 10, 2019

(65) Prior Publication Data

US 2019/0239031 A1 Aug. 1, 2019

Related U.S. Application Data

(63) Continuation of application No. PCT/CN2016/101827, filed on Oct. 11, 2016.

(51) Int. Cl.
*H04W 4/029* (2018.01)
*H04W 24/10* (2009.01)
*H04W 64/00* (2009.01)

(52) U.S. Cl.
CPC .......... *H04W 4/029* (2018.02); *H04W 24/10* (2013.01); *H04W 64/00* (2013.01); *Y02D 30/70* (2020.08)

(58) Field of Classification Search
CPC ..... H04W 24/10; H04W 4/029; H04W 64/00; Y02D 70/00; G01S 5/0236
See application file for complete search history.

(56) References Cited

U.S. PATENT DOCUMENTS

2009/0131078 A1 5/2009 Yang
2012/0295623 A1 11/2012 Siomina
(Continued)

FOREIGN PATENT DOCUMENTS

CN 1913705 A 2/2007
CN 101772063 A 7/2010
(Continued)

OTHER PUBLICATIONS

3GPP TR 23.730 V1.1.0 (Sep. 2016) "3rd Generation Partnership Project;Technical Specification Group Services and System Aspects" Study on extended architecture support for Cellular Internet of Things (Release 14), Sep. 2016, 54 pages.
(Continued)

*Primary Examiner* — Quoc Thai N Vu
(74) *Attorney, Agent, or Firm* — Fish & Richardson P.C.

(57) ABSTRACT

The present disclosure relates to information transmission methods. One example method includes obtaining, by a positioning center, coverage indication information, where the coverage indication information is used to indicate a coverage enhancement level of user equipment UE, indicate that UE is at a first coverage enhancement level, or to indicate that UE requests to reduce a quantity of to-be-measured cells, and sending, by the positioning center, positioning measurement configuration information to the UE, where the positioning measurement configuration information is determined by the positioning center based on the coverage indication information, and the positioning measurement configuration information is used to perform positioning measurement configuration on the UE.

18 Claims, 12 Drawing Sheets

(56) References Cited

U.S. PATENT DOCUMENTS

| | | | |
|---|---|---|---|
| 2014/0098761 A1 | 4/2014 | Lee et al. | |
| 2015/0099540 A1 | 4/2015 | Siomina et al. | |
| 2015/0219750 A1 | 8/2015 | Xiao et al. | |
| 2015/0365790 A1* | 12/2015 | Edge | H04W 4/90 455/404.2 |
| 2017/0064670 A1 | 3/2017 | Sharp | |
| 2017/0245158 A1 | 8/2017 | Xiao et al. | |

FOREIGN PATENT DOCUMENTS

| | | |
|---|---|---|
| CN | 102742335 A | 10/2012 |
| CN | 104301994 A | 1/2015 |
| CN | 105101044 A | 11/2015 |
| CN | 105900478 A | 8/2016 |
| CN | 107306421 A | 10/2017 |
| WO | 2016070423 A1 | 5/2016 |
| WO | 2016154346 A1 | 9/2016 |

OTHER PUBLICATIONS

3GPP TS 29.171 V13.2.0 (Mar. 2016), "3rd Generation Partnership Project;Technical Specification Group Core Network and Terminals;Location Services (LCS)" LCS Application Protocol (LCS-AP) between the Mobile Management Entity (MME) and Evolved Serving Mobile Location Centre (E-SMLC), SLs interface(Release 13), 54 pages.

3GPP TS 36.355 V13.2.0 (Sep. 2016), "3rd Generation Partnership Project;Technical Specification Group Radio Access Network" Evolved Universal Terrestrial Radio Access (E-UTRA), LTE Positioning Protocol (LPP)(Release 13), 141 pages.

3GPP TS 23.401 V14.1.0 (Sep. 2016), "3rd Generation Partnership Project;Technical Specification Group Services and System Aspects" General Packet Radio Service (GPRS) enhancements for Evolved Universal Terrestrial Radio Access Network (E-UTRAN) access(Release 14), 379 pages.

3GPP TS 36.413 V14.0.0 (Sep. 2016), "3rd Generation Partnership Project;Technical Specification Group Radio Access Network" Evolved Universal Terrestrial Radio Access Network(E-UTRAN), S1 Application Protocol (S1AP)(Release 14), 333 pages.

3GPP TS 24.301 V14.1.0 (Sep. 2016), "3rd Generation Partnership Project;Technical Specification Group Core Network and Terminals" Non-Access-Stratum (NAS) protocol for Evolved Packet System (EPS), Stage 3(Release 14), 460 pages.

3GPP TS 36.331 V14.0.0 (Sep. 2016), "3rd Generation Partnership Project;Technical Specification Group Radio Access Network" Evolved Universal Terrestrial Radio Access (E-UTRA), Radio Resource Control (RRC), Protocol specification (Release 14), 644 pages.

Extended European Search Report issued in Application No. 16918580.8, dated Jun. 17, 2019, 7 pages.

PCT International Search Report and Written Opinion in International Application No. PCT/CN2016/101827, dated Jun. 30, 2017, 17 pages (With English translation).

Qualcomm Incorporated, "Key Issues and Solutions for Location Support for CIoT Devices—2", Abstract, Presented at SA WG2 Meeting #116bis S2-164847(revision of S2-164490), Sanya, P.R. China, Aug. 29, 2016-Sep. 2, 2016, 7 pages.

Ratasuk et al., "Coverage Enhancement for M2M Communications using LTE",2014 21st International Conference on Telecommunications ICT, IEEE, May 4-7, 2014, 6 pages.

Office Action issued in Chinese Application No. 201680089872.7 dated Dec. 12, 2019, 11 pages (with English translation).

Search Report issued in Chinese Application No. 201680089872.7 dated Dec. 4, 2019, 2 pages.

Office Action issued in Chinese Application No. 201680089872.7 dated Jun. 28, 2020, 18 pages (with English translation).

\* cited by examiner

INFORMATION TRANSMISSION METHOD AND DEVICE

CROSS-REFERENCE TO RELATED APPLICATIONS

This application is a continuation of International Application No. PCT/CN2016/101827, filed on Oct. 11, 2016, the disclosure of which is hereby incorporated by reference in its entirety.

TECHNICAL FIELD

The present invention relates to the communications field, and more specifically, to an information transmission method, a positioning center, a core network device, a base station, and user equipment.

BACKGROUND

A location service (LCS) service means that a mobile communications system obtains geographic location information (such as longitudinal and latitudinal coordinates) of a mobile terminal by using a specific positioning technology, provides the geographic location information to a mobile user, a communications system, or a third-party positioning client, and provides a call or non-call service related to a location of the mobile user for the mobile user with the support of specific electronic map information.

In a prior-art positioning manner, when user equipment (UE) has relatively poor coverage, the UE still needs to perform measurement based on positioning measurement configuration of a positioning center, and report location information. However, when positioning accuracy permits, the positioning measurement configuration of the positioning center may be unsuitable for the UE in this case, resulting in an increase in UE power consumption and signaling overheads.

SUMMARY

Embodiments of the present invention provide an information transmission method, so that a positioning center can perform more flexible measurement configuration on UE.

According to a first aspect, an information transmission method is provided, including: obtaining, by a positioning center, coverage indication information, where the coverage indication information is used to indicate a coverage enhancement level of user equipment UE, indicate that the UE is at a low coverage enhancement level, or indicate that the UE requests to reduce a quantity of to-be-measured cells; and sending, by the positioning center, the positioning measurement configuration information to the UE, where the positioning measurement configuration information is determined by the positioning center based on the coverage indication information, and the positioning measurement configuration information is used to perform positioning measurement configuration on the UE.

According to this embodiment of the present invention, the positioning center can perform more flexible measurement configuration on the UE based on coverage of the UE or based on a request made by the UE to reduce the quantity of to-be-measured cells. For example, when the UE performs positioning measurement at a relatively high coverage enhancement level or at the low coverage enhancement level, the positioning center may reduce, by reducing the quantity of cells that are to be measured by the UE, a quantity of measurement reports that are to be reported by the UE, so that power consumption of the UE and a delay of reporting the measurement reports by the UE can be reduced. In addition, the positioning center configures an appropriate response time or configures the UE to measure an intra-frequency cell. This can ensure that the UE completes current positioning measurement in relatively poor coverage, with no need to trigger next measurement, thereby improving efficiency, reducing signaling overheads, and further reducing the power consumption.

In a possible implementation, the obtaining, by a positioning center, coverage indication information includes: receiving, by the positioning center, the coverage indication information sent by a core network device.

In a possible implementation, the obtaining, by a positioning center, coverage indication information includes: receiving, by the positioning center, the coverage indication information sent by the UE.

In a possible implementation, the receiving, by the positioning center, the coverage indication information sent by a mobility management entity/core network device includes: receiving, by the positioning center, a location service request message sent by the core network device, where the location service request message includes the coverage indication information.

In a possible implementation, the receiving, by the positioning center, the coverage indication information sent by the UE includes: receiving, by the positioning center, a positioning capability reporting message sent by the UE, where the positioning capability reporting message includes the coverage indication information.

In a possible implementation, before the receiving, by the positioning center, a positioning capability reporting message sent by the UE, the method further includes: sending, by the positioning center, a positioning capability request message to the UE, where the positioning capability request message is used to request the coverage indication information; and the receiving, by the positioning center, a positioning capability reporting message sent by the UE includes: receiving, by the positioning center, the positioning capability reporting message sent by the UE based on the positioning capability request message.

In a possible implementation, the receiving, by the positioning center, the coverage indication information sent by the UE includes: receiving, by the positioning center, a request assistance data message sent by the UE, where the request assistance data message includes the coverage indication information.

In a possible implementation, the positioning measurement configuration information includes at least one of the following information about the UE: the quantity of to-be-measured cells, a response time for responding to a location information request message, and to-be-measured frequency information.

In a possible implementation, the sending, by the positioning center, the positioning measurement configuration information to the UE includes: sending, by the positioning center, a provide assistance data message to the UE, where the provide assistance data message includes the positioning measurement configuration information.

In a possible implementation, the method further includes: receiving, by the positioning center, changed-coverage indication information, where the changed-coverage indication information is used to indicate a changed coverage enhancement level.

According to a second aspect, an information transmission method is provided, including: receiving, by a core network device, coverage indication information sent by a base station, where the coverage indication information is used to indicate a coverage enhancement level of user equipment UE, indicate that the UE is at a low coverage enhancement level, or indicate that the UE requests to reduce a quantity of to-be-measured cells; and sending, by the core network device, the coverage indication information to a positioning center, so that the positioning center performs positioning measurement configuration on the UE based on the coverage indication information.

According to the information transmission method in this embodiment of the present invention, the core network device sends the coverage indication information to the positioning center, so that the positioning center can perform more flexible measurement configuration on the UE based on coverage of the UE or based on a request made by the UE to reduce the quantity of to-be-measured cells.

In a possible implementation, the receiving, by a core network device, coverage indication information sent by a base station includes: receiving, by the core network device, an initial UE message or a UE context resume request message sent by the base station, where the initial UE message or the UE context resume request message includes the coverage indication information.

In a possible implementation, the receiving, by a core network device, coverage indication information sent by a base station includes: sending, by the core network device, a coverage request message to the base station, where the coverage request message is used to request the coverage indication information; and receiving, by the core network device, a coverage request response message sent by the base station, where the coverage request response message is used to respond to the coverage request message, and the coverage request response message includes the coverage indication information.

In a possible implementation, the sending, by the core network device, the coverage indication information to a serving mobile location center/positioning center includes: sending, by the core network device, a location service request message to the core network device, where the location service request message includes the coverage indication information.

In a possible implementation, the method further includes: receiving, by the core network device, changed-coverage indication information sent by the base station, where the changed-coverage indication information is used to indicate a changed coverage enhancement level; and sending, by the core network device, the changed-coverage indication information to the positioning center, so that the positioning center performs positioning measurement configuration on the UE based on the changed-coverage indication information.

According to a third aspect, an information transmission method is provided, including: determining, by a base station, coverage indication information based on a coverage enhancement level of user equipment UE, where the coverage indication information is used to indicate the coverage enhancement level of the UE, indicate that the UE is at a low coverage enhancement level, or indicate that the UE requests to reduce a quantity of to-be-measured cells; and sending, by the base station, the coverage indication information to a core network device.

In a possible implementation, the sending, by the base station, the coverage indication information to a mobility management entity/core network device includes: sending, by the base station, an initial UE message or a UE context resume request message to the core network device, where the initial UE message or the UE context resume request message includes the coverage indication information.

In a possible implementation, before the sending, by the base station, the coverage indication information to a mobility management entity/core network device, the method further includes: receiving, by the base station, a coverage request message sent by the core network device, where the coverage request message is used to request the coverage indication information; and the sending, by the base station, the coverage indication information to a mobility management entity/core network device includes: sending, by the base station, a coverage request response message to the core network device based on the request message, where the coverage request response message is used to respond to the coverage request message, and the response message includes the coverage indication information.

In a possible implementation, the coverage indication information is used to indicate the coverage enhancement level of the user equipment UE, and the method further includes: sending, by the base station, changed-coverage indication information to the core network device when the base station determines that the coverage enhancement level of the UE changes, where the changed-coverage indication information is used to indicate a changed coverage enhancement level.

According to a fourth aspect, an information transmission method is provided, including: sending, by user equipment UE, coverage indication information to a positioning center, where the coverage indication information is used to indicate a coverage enhancement level of the UE, indicate that the UE is at a low coverage enhancement level, or indicate that the UE requests to reduce a quantity of to-be-measured cells; and receiving, by the UE, positioning measurement configuration information sent by the positioning center based on the coverage indication information, where the positioning measurement configuration information is used to perform positioning measurement configuration on the UE.

According to this embodiment of the present invention, the UE sends the coverage indication information to the positioning center, so that the positioning center can perform more flexible measurement configuration on the UE based on coverage of the UE or based on a request made by the UE to reduce the quantity of to-be-measured cells. For example, when the UE performs positioning measurement at a relatively high coverage enhancement level or at the low coverage enhancement level, the positioning center may reduce, by reducing the quantity of cells that are to be measured by the UE, a quantity of measurement reports that are to be reported by the UE, so that power consumption of the UE and a delay of reporting the measurement reports by the UE can be reduced. In addition, the positioning center configures an appropriate response time or configures the UE to measure an intra-frequency cell. This can ensure that the UE completes current positioning measurement in relatively poor coverage, with no need to trigger next measurement, thereby improving efficiency, reducing signaling overheads, and further reducing the power consumption.

In a possible implementation, the sending, by user equipment UE, coverage indication information to a serving mobile location center/positioning center includes: sending, by the user equipment, a positioning capability reporting message to the positioning center, where the positioning capability reporting message carries the coverage indication information.

In a possible implementation, before the sending, by the user equipment, a positioning capability reporting message to the positioning center, the method further includes: receiving, by the UE, a positioning capability request message sent by the positioning center, where the positioning capability request message is used to request the coverage indication information; and the sending, by the user equipment, a positioning capability reporting message to the positioning center includes: sending, by the UE, the positioning capability reporting message to the positioning center based on the positioning capability request message.

In a possible implementation, the sending, by user equipment UE, coverage indication information to a serving mobile location center/positioning center includes: sending, by the user equipment, a request assistance data message to the positioning center, where the request assistance data message includes the coverage indication information.

In a possible implementation, the positioning measurement configuration information includes at least one of the following information about the UE: the quantity of to-be-measured cells, a response time for responding to the location information request message, and to-be-measured frequency information.

In a possible implementation, the receiving, by the UE, positioning measurement configuration information sent by the positioning center based on the coverage indication information includes: receiving, by the UE, a provide assistance data message sent by the positioning center based on the coverage indication information, where the provide assistance data message includes the positioning measurement configuration information.

In a possible implementation, the method further includes: sending, by the UE, changed-coverage indication information to the positioning center after the coverage enhancement level of the UE changes, where the changed-coverage indication information is used to indicate a changed coverage enhancement level, and the changed-coverage indication information is further used to instruct the positioning center to perform positioning measurement configuration on the UE.

According to a fifth aspect, a positioning center is provided, and is configured to perform the method in any one of the first aspect or the possible implementations of the first aspect. Specifically, the positioning center includes units configured to perform the method in any one of the first aspect or the possible implementations of the first aspect.

According to a sixth aspect, a core network device is provided, and is configured to perform the method in any one of the second aspect or the possible implementations of the second aspect. Specifically, the core network device includes units configured to perform the method in any one of the second aspect or the possible implementations of the second aspect.

According to a seventh aspect, a base station is provided, and is configured to perform the method in any one of the third aspect or the possible implementations of the third aspect. Specifically, the base station includes units configured to perform the method in any one of the third aspect or the possible implementations of the third aspect.

According to an eighth aspect, user equipment is provided, and is configured to perform the method in any one of the fourth aspect or the possible implementations of the fourth aspect. Specifically, the user equipment includes units configured to perform the method in any one of the fourth aspect or the possible implementations of the fourth aspect.

According to a ninth aspect, a positioning center is provided. The positioning center includes a receiver, a transmitter, a processor, a memory, and a bus system. The receiver, the transmitter, the processor, and the memory are connected by using the bus system. The memory is configured to store an instruction, and the processor is configured to execute the instruction stored in the memory, to control the receiver to receive a signal and control the transmitter to send a signal. In addition, when the processor executes the instruction stored in the memory, the execution enables the processor to perform the method in any one of the first aspect or the possible implementations of the first aspect.

According to a tenth aspect, a core network device is provided. The core network device includes a receiver, a transmitter, a processor, a memory, and a bus system. The receiver, the transmitter, the processor, and the memory are connected by using the bus system. The memory is configured to store an instruction, and the processor is configured to execute the instruction stored in the memory, to control the receiver to receive a signal and control the transmitter to send a signal. In addition, when the processor executes the instruction stored in the memory, the execution enables the processor to perform the method in any one of the second aspect or the possible implementations of the second aspect.

According to an eleventh aspect, a base station is provided. The base station includes a receiver, a transmitter, a processor, a memory, and a bus system. The receiver, the transmitter, the processor, and the memory are connected by using the bus system. The memory is configured to store an instruction, and the processor is configured to execute the instruction stored in the memory, to control the receiver to receive a signal and control the transmitter to send a signal. In addition, when the processor executes the instruction stored in the memory, the execution enables the processor to perform the method in any one of the third aspect or the possible implementations of the third aspect.

According to a twelfth aspect, user equipment is provided. The user equipment includes a receiver, a transmitter, a processor, a memory, and a bus system. The receiver, the transmitter, the processor, and the memory are connected by using the bus system. The memory is configured to store an instruction, and the processor is configured to execute the instruction stored in the memory, to control the receiver to receive a signal and control the transmitter to send a signal. In addition, when the processor executes the instruction stored in the memory, the execution enables the processor to perform the method in any one of the fourth aspect or the possible implementations of the fourth aspect.

According to a thirteenth aspect, this application provides a computer readable medium, configured to store a computer program. The computer program includes an instruction used to perform the method in any one of the first aspect or the possible implementations of the first aspect.

According to a fourteenth aspect, a computer readable medium is provided, and is configured to store a computer program. The computer program includes an instruction used to perform the method in any one of the second aspect or the possible implementations of the second aspect.

According to a fifteenth aspect, a computer readable medium is provided, and is configured to store a computer program. The computer program includes an instruction used to perform the method in any one of the third aspect or the possible implementations of the third aspect.

According to a sixteenth aspect, a computer readable medium is provided, and is configured to store a computer program. The computer program includes an instruction used to perform the method in any one of the fourth aspect or the possible implementations of the fourth aspect.

According to a seventeenth aspect, a radio resource control (RRC) connection method is provided, including: sending, by user equipment UE, establishment indication information to a target base station, where the establishment indication information is used to indicate, to the target base station, that the UE uses either a control plane (CP) scheme or a user plane (UP) scheme to establish an RRC connection.

The UE may use either the CP scheme or the UP scheme when re-establishing or resuming the RRC connection to the target base station. However, the target base station cannot determine which scheme is used by the UE to re-establish (including re-establish and resume) the RRC connection. According to the RRC connection method in this embodiment of the present invention, the UE may make an indication to the target base station, so that the target base station can determine which scheme is used by the UE to establish the RRC connection. In this way, the target base station can determine an operation procedure of obtaining a context of the UE, namely, whether to use a CP-related operation procedure or a UP-related operation procedure. Further, the target base station can obtain the context of the UE by using a corresponding procedure, and establish the RRC connection to the UE.

In a possible implementation, the sending, by user equipment UE, establishment indication information to a target base station includes:

sending, by the UE, an RRC connection re-establishment request message to the target base station, where the connection establishment request message carries the establishment indication information; or sending, by the UE, an RRC connection resume request message to the target base station, where the RRC connection resume request message carries the establishment indication information.

In a possible implementation, the RRC connection re-establishment request message or the RRC connection resume request message further includes first identifier information, and the first identifier information is used to identify or check the UE.

In a possible implementation, the first identifier information includes at least one of the following: a hash serving temporary mobile subscriber identity (S-TMSI), a truncated S-TMSI, a mobility management entity temporary mobile subscriber identity (M-TMSI), a dedicated user identity, a base station ID, a truncated base station ID, an E-UTRAN cell global identifier (ECGI), a base station UE S1 identifier eNB UE S1AP ID, where the hash S-TMSI, the truncated S-TMSI, and the M-TMSI are obtained based on an S-TMSI, and the dedicated user identity is a user identity allocated by a source base station to perform addressing and store a context.

In a possible implementation, before the sending, by user equipment UE, establishment indication information to a target base station, the method further includes:

sending, by the UE, the S-TMSI to the source base station, where the S-TMSI is used by the source base station to generate the first identifier information according to a preset algorithm; and generating, by the UE, the first identifier information according to the preset algorithm.

In a possible implementation, before the sending, by user equipment UE, establishment indication information to a target base station, the method further includes:

receiving, from a core network device by the UE, the dedicated user identity forwarded by the source base station by using a downlink NAS message; and sending, by the UE, the dedicated user identity to the target base station.

In a possible implementation, the method further includes:

receiving, by the UE, offset indication information, where the offset indication information is used to indicate a cell signal quality offset, and the cell signal quality offset is used by the UE to trigger a radio link failure or connected mode cell reselection.

According to an eighteenth aspect, a radio resource control RRC connection method is provided, including: receiving, by a target base station, establishment indication information sent by user equipment UE, where the establishment indication information is used to indicate, to the target base station, that the UE uses either a control plane CP scheme or a user plane UP scheme to establish an RRC connection;

sending, by the target base station, a radio link failure indication message or a retrieve UE context request message to a source base station, where the radio link failure indication message or the retrieve UE context request message includes the establishment indication information, and the radio link failure indication message or the retrieve UE context request message is used to request a context of the UE; and receiving, by the target base station, a handover request message sent by the source base station based on the radio link failure indication message, or receiving, by the target base station, a retrieve UE context response message sent by the source base station based on the retrieve UE context request message, where the handover request message or the retrieve UE context response message includes the context of the UE.

In a possible implementation, the receiving, by a target base station, establishment indication information sent by user equipment UE includes:

receiving, by the target base station, an RRC connection re-establishment request message sent by the UE, where the connection establishment request message carries the establishment indication information; or receiving, by the target base station, an RRC connection resume request message sent by the UE, where the RRC connection resume request message carries the establishment indication information.

In a possible implementation, the RRC connection re-establishment request message or the RRC connection resume request message further includes first identifier information, and the first identifier information is used to identify or check the UE.

In a possible implementation, the radio link failure indication message or the retrieve UE context request message further includes the first identifier information.

In a possible implementation, the first identifier information includes any one of the following:

a hash serving temporary mobile subscriber identity hash S-TMSI, a truncated S-TMSI, a mobility management entity temporary mobile subscriber identity M-TMSI, a dedicated user identity, a base station ID, a truncated base station ID, an E-UTRAN cell global identifier ECGI, and an eNB UE S1AP ID, where the hash S-TMSI, the truncated S-TMSI, and the M-TMSI are obtained based on an S-TMSI, and the dedicated user identity is a user identity allocated by the source base station to perform addressing and store a context.

In a possible implementation, the method further includes:

sending, by the target base station, offset indication information to the UE, where the offset indication information is used to indicate a cell signal quality offset, and the cell signal quality offset is used by the UE to trigger a radio link failure or connected mode cell reselection.

According to a nineteenth aspect, a radio resource control RRC connection method is provided, including: receiving, by a source base station, a radio link failure indication message or a retrieve UE context request message sent by a target base station, where the radio link failure indication message or the retrieve user equipment UE context request message includes establishment indication information, the radio link failure indication message or the retrieve UE context request message is used to request a context of the UE, and the establishment indication information is used to indicate that the UE uses either a control plane CP scheme or a user plane UP scheme to establish an RRC connection; and sending, by the source base station, a handover request message to the target base station based on the radio link failure indication message, or sending, by the source base station, a retrieve UE context response message to the target base station based on the retrieve UE context request message, where the handover request message or the retrieve UE context response message includes the context of the UE.

In a possible implementation, the radio link failure indication message or the retrieve UE context request message further includes the first identifier information, and the first identifier information is used to identify or check the UE.

In a possible implementation, the first identifier information includes one of the following:

a hash serving temporary mobile subscriber identity hash S-TMSI, a truncated S-TMSI, a mobility management entity temporary mobile subscriber identity M-TMSI, a dedicated user identity, a base station ID, a truncated base station ID, an E-UTRAN cell global identifier ECGI, and an eNB UE S1AP ID, where the hash S-TMSI, the truncated S-TMSI, and the M-TMSI are obtained based on an S-TMSI, and the dedicated user identity is a user identity allocated by the source base station to perform addressing and store a context.

In a possible implementation, before the receiving, by a source base station, a radio link failure indication message or a retrieve UE context request message sent by a target base station, the method further includes:

receiving, by the source base station, the S-TMSI sent by the UE; and generating, by the source base station, the first identifier information according to the S-TMSI and a preset algorithm.

In a possible implementation, before the receiving, by a source base station, a radio link failure indication message or a retrieve UE context request message sent by a target base station, the method further includes:

receiving, by the source base station, the S-TMSI sent by a core network device; and generating, by the source base station, the first identifier information according to the S-TMSI and a preset algorithm.

In a possible implementation, before the sending, by the source base station, a handover request message to the target base station based on the radio link failure indication message, or before the sending, by the source base station, a retrieve UE context response message to the target base station based on the retrieve UE context request message, the method further includes:

identifying or checking, by the source base station, the UE based on the first identifier information.

In a possible implementation, the method further includes:

sending, by the source base station, offset indication information to the UE, where the offset indication information is used to indicate a cell signal quality offset, and the cell signal quality offset is used by the UE to trigger a radio link failure or connected mode cell reselection.

According to a twentieth aspect, a radio resource control RRC connection method is provided, including:

receiving, by a core network device, a dedicated user identity sent by a source base station, where the dedicated user identity is a user identity allocated by the base station to perform addressing and store a context; and sending, by the core network device, the dedicated user identity to user equipment UE by using a downlink NAS message of the source base station.

According to a twenty-first aspect, user equipment is provided, and is configured to perform the method in any one of the seventeenth aspect or the possible implementations of the seventeenth aspect. Specifically, the user equipment includes units configured to perform the method in any one of the seventeenth aspect or the possible implementations of the seventeenth aspect.

According to a twenty-second aspect, a target base station is provided, and is configured to perform the method in any one of the eighteenth aspect or the possible implementations of the eighteenth aspect. Specifically, the target base station includes units configured to perform the method in any one of the eighteenth aspect or the possible implementations of the eighteenth aspect.

According to a twenty-third aspect, a source base station is provided, and is configured to perform the method in any one of the nineteenth aspect or the possible implementations of the nineteenth aspect. Specifically, the source base station includes units configured to perform the method in any one of the nineteenth aspect or the possible implementations of the nineteenth aspect.

According to a twenty-fourth aspect, a core network device is provided, and is configured to perform the method in any one of the twentieth aspect or the possible implementations of the twentieth aspect. Specifically, the core network device includes units configured to perform the method in any one of the twentieth aspect or the possible implementations of the twentieth aspect.

According to a twenty-fifth aspect, user equipment is provided. The user equipment includes a receiver, a transmitter, a processor, a memory, and a bus system. The receiver, the transmitter, the processor, and the memory are connected by using the bus system. The memory is configured to store an instruction, and the processor is configured to execute the instruction stored in the memory, to control the receiver to receive a signal and control the transmitter to send a signal. In addition, when the processor executes the instruction stored in the memory, the execution enables the processor to perform the method in any one of the seventeenth aspect or the possible implementations of the seventeenth aspect.

According to a twenty-sixth aspect, a target base station is provided. The target base station includes a receiver, a transmitter, a processor, a memory, and a bus system. The receiver, the transmitter, the processor, and the memory are connected by using the bus system. The memory is configured to store an instruction, and the processor is configured to execute the instruction stored in the memory, to control the receiver to receive a signal and control the transmitter to send a signal. In addition, when the processor executes the instruction stored in the memory, the execution enables the processor to perform the method in any one of the eighteenth aspect or the possible implementations of the eighteenth aspect.

According to a twenty-seventh aspect, a source base station is provided. The source base station includes a receiver, a transmitter, a processor, a memory, and a bus system. The receiver, the transmitter, the processor, and the memory are connected by using the bus system. The memory is configured to store an instruction, and the processor is configured to execute the instruction stored in the memory, to control the receiver to receive a signal and control the transmitter to send a signal. In addition, when the processor executes the instruction stored in the memory, the execution enables the processor to perform the method in any one of the nineteenth aspect or the possible implementations of the nineteenth aspect.

According to a twenty-eighth aspect, a core network device is provided. The core network device includes a receiver, a transmitter, a processor, a memory, and a bus system. The receiver, the transmitter, the processor, and the memory are connected by using the bus system. The memory is configured to store an instruction, and the processor is configured to execute the instruction stored in the memory, to control the receiver to receive a signal and control the transmitter to send a signal. In addition, when the processor executes the instruction stored in the memory, the execution enables the processor to perform the method in any one of the twentieth aspect or the possible implementations of the twentieth aspect.

According to a twenty-ninth aspect, this application provides a computer readable medium, configured to store a computer program. The computer program includes an instruction used to perform the method in any one of the seventeenth aspect or the possible implementations of the seventeenth aspect.

According to a thirtieth aspect, a computer readable medium is provided, and is configured to store a computer program. The computer program includes an instruction used to perform the method in any one of the eighteenth aspect or the possible implementations of the eighteenth aspect.

According to a thirty-first aspect, a computer readable medium is provided, and is configured to store a computer program. The computer program includes an instruction used to perform the method in any one of the nineteenth aspect or the possible implementations of the nineteenth aspect.

According to a thirty-second aspect, a computer readable medium is provided, and is configured to store a computer program. The computer program includes an instruction used to perform the method in any one of the twentieth aspect or the possible implementations of the twentieth aspect.

According to a thirty-third aspect, a radio resource control RRC connection method is provided, including:

sending, by user equipment UE, first identifier information to a target base station, where the first identifier information is used to identify or check the UE when the UE uses a control plane CP scheme to establish an RRC connection.

According to the RRC connection method in this embodiment of the present invention, when the CP scheme is used to establish the RRC connection, the target base station can obtain a context of the UE from a source base station by using the first identifier information, and establish the RRC connection to the UE.

In a possible implementation, the sending, by user equipment UE, first identifier information to a target base station includes:

sending, by the user equipment UE, an RRC connection re-establishment request message to the target base station, where the connection establishment request message carries the first identifier information; or sending, by the UE, an RRC connection resume request message to the target base station, where the RRC connection resume request message carries the first identifier information.

In a possible implementation, the first identifier information includes any one of the following:

a hash serving temporary mobile subscriber identity hash S-TMSI, a truncated S-TMSI, a mobility management entity temporary mobile subscriber identity M-TMSI, a dedicated user identity, a base station ID, a truncated base station ID, an E-UTRAN cell global identifier ECGI, and an eNB UE S1AP ID, where the hash S-TMSI, the truncated S-TMSI, and the M-TMSI are obtained based on an S-TMSI, and the dedicated user identity is a user identity allocated by the source base station to perform addressing and store a context.

In a possible implementation, before the sending, by user equipment UE, first identifier information to a target base station, the method further includes:

sending, by the UE, the S-TMSI to the source base station, where the S-TMSI is used by the source base station to generate the first identifier information according to a preset algorithm; and generating, by the UE, the first identifier information according to the preset algorithm.

In a possible implementation, before the sending, by user equipment UE, first identifier information to a target base station, the method further includes:

receiving, from a core network device by the UE, the dedicated user identity forwarded by the source base station by using a downlink NAS message; and sending, by the UE, the dedicated user identity to the target base station.

In a possible implementation, the method further includes:

receiving, by the UE, offset indication information, where the offset indication information is used to indicate a cell signal quality offset, and the cell signal quality offset is used by the UE to trigger a radio link failure or connected mode cell reselection.

According to a thirty-fourth aspect, a radio resource control RRC connection method is provided, including:

receiving, by a target base station, first identifier information sent by user equipment UE, where the first identifier information is used to identify or check the UE when the UE uses a control plane CP scheme to establish an RRC connection;

sending, by the target base station, a radio link failure indication message or a retrieve UE context request message to a source base station, where the radio link failure indication message or the retrieve UE context request message includes the first identifier information, and the radio link failure indication message or the retrieve UE context request message is used to request a context of the UE; and receiving, by the target base station, a handover request message sent by the source base station based on the radio link failure indication message, or receiving, by the target base station, a retrieve UE context response message sent by the source base station based on the retrieve UE context request message, where the handover request message or the retrieve UE context response message includes the context of the UE.

In a possible implementation, the receiving, by a target base station, first identifier information sent by user equipment UE includes:

receiving, by the target base station, an RRC connection re-establishment request message sent by the UE, where the connection establishment request message carries the first identifier information; or receiving, by the target base station, an RRC connection resume request message sent by the UE, where the RRC connection resume request message carries the first identifier information.

In a possible implementation, the first identifier information includes any one of the following:

a hash serving temporary mobile subscriber identity hash S-TMSI, a truncated S-TMSI, a mobility management entity temporary mobile subscriber identity M-TMSI, a dedicated user identity, a base station ID, a truncated base station ID, an E-UTRAN cell global identifier ECGI, and an eNB UE S1AP ID, where the hash S-TMSI, the truncated S-TMSI, and the M-TMSI are obtained based on an S-TMSI, and the dedicated user identity is a user identity allocated by the source base station to perform addressing and store a context.

In a possible implementation, the method further includes: sending, by the target base station, offset indication information to the UE, where the offset indication information is used to indicate a cell signal quality offset, and the cell signal quality offset is used by the UE to trigger a radio link failure or connected mode cell reselection.

According to a thirty-fifth aspect, a radio resource control RRC connection method is provided, including:

receiving, by a source base station, a radio link failure indication message or a retrieve UE context request message sent by a target base station, where the radio link failure indication message or the retrieve user equipment UE context request message includes first identifier information, the first identifier information is used to identify or check the UE when the UE uses a control plane CP scheme to establish an RRC connection, and the radio link failure indication message or the retrieve UE context request message is used to request a context of the UE;

identifying or checking, by the source base station, the UE based on the first identifier information; and sending, by the source base station, a handover request message to the target base station based on the radio link failure indication message, or sending, by the source base station, a retrieve UE context response message to the target base station based on the retrieve UE context request message, where the handover request message or the retrieve UE context response message includes the context of the UE.

In a possible implementation, the first identifier information includes one of the following:

a hash serving temporary mobile subscriber identity hash S-TMSI, a truncated S-TMSI, a mobility management entity temporary mobile subscriber identity M-TMSI, a dedicated user identity, a base station ID, a truncated base station ID, an E-UTRAN cell global identifier ECGI, and an eNB UE S1AP ID, where the hash S-TMSI, the truncated S-TMSI, and the M-TMSI are obtained based on an S-TMSI, and the dedicated user identity is a user identity allocated by the source base station to perform addressing and store a context.

In a possible implementation, before the receiving, by a source base station, a radio link failure indication message or a retrieve UE context request message sent by a target base station, the method further includes:

receiving, by the source base station, the S-TMSI sent by the UE; and generating, by the source base station, the first identifier information according to the S-TMSI and a preset algorithm.

In a possible implementation, before the receiving, by a source base station, a radio link failure indication message or a retrieve UE context request message sent by a target base station, the method further includes:

receiving, by the source base station, the S-TMSI sent by a core network device; and generating, by the source base station, the first identifier information according to the S-TMSI and a preset algorithm.

In a possible implementation, the method further includes:

sending, by the source base station, offset indication information to the UE, where the offset indication information is used to indicate a cell signal quality offset, and the cell signal quality offset is used by the UE to trigger a radio link failure or connected mode cell reselection.

According to a thirty-sixth aspect, a radio resource control RRC connection method is provided, including:

receiving, by a core network device, a dedicated user identity sent by a source base station, where the dedicated user identity is a user identity allocated by the base station to perform addressing and store a context; and sending, by the core network device, the dedicated user identity to user equipment UE by using a downlink NAS message of the source base station.

According to a thirty-seventh aspect, user equipment is provided, and is configured to perform the method in any one of the thirty-third aspect or the possible implementations of the thirty-third aspect. Specifically, the user equipment includes units configured to perform the method in any one of the thirty-third aspect or the possible implementations of the thirty-third aspect.

According to a thirty-eighth aspect, a target base station is provided, and is configured to perform the method in any one of the thirty-fourth aspect or the possible implementations of the thirty-fourth aspect. Specifically, the target base station includes units configured to perform the method in any one of the thirty-fourth aspect or the possible implementations of the thirty-fourth aspect.

According to a thirty-ninth aspect, a source base station is provided, and is configured to perform the method in any one of the thirty-fifth aspect or the possible implementations of the thirty-fifth aspect. Specifically, the source base station includes units configured to perform the method in any one of the thirty-fifth aspect or the possible implementations of the thirty-fifth aspect.

According to a fortieth aspect, a core network device is provided, and is configured to perform the method in any one of the thirty-sixth aspect or the possible implementations of the thirty-sixth aspect. Specifically, the source base station includes units configured to perform the method in any one of the thirty-sixth aspect or the possible implementations of the thirty-sixth aspect.

According to a forty-first aspect, user equipment is provided. The user equipment includes a receiver, a transmitter, a processor, a memory, and a bus system. The receiver, the transmitter, the processor, and the memory are connected by using the bus system. The memory is configured to store an instruction, and the processor is configured to execute the instruction stored in the memory, to control the receiver to receive a signal and control the transmitter to send a signal. In addition, when the processor executes the instruction stored in the memory, the execution enables the processor to perform the method in any one of the thirty-third aspect or the possible implementations of the thirty-third aspect.

According to a forty-second aspect, a target base station is provided. The target base station includes a receiver, a transmitter, a processor, a memory, and a bus system. The receiver, the transmitter, the processor, and the memory are connected by using the bus system. The memory is configured to store an instruction, and the processor is configured to execute the instruction stored in the memory, to control the receiver to receive a signal and control the transmitter to send a signal. In addition, when the processor executes the instruction stored in the memory, the execution enables the processor to perform the method in any one of the thirty-fourth aspect or the possible implementations of the thirty-fourth aspect.

According to a forty-third aspect, a source base station is provided. The source base station includes a receiver, a transmitter, a processor, a memory, and a bus system. The receiver, the transmitter, the processor, and the memory are connected by using the bus system. The memory is configured to store an instruction, and the processor is configured to execute the instruction stored in the memory, to control the receiver to receive a signal and control the transmitter to send a signal. In addition, when the processor executes the instruction stored in the memory, the execution enables the processor to perform the method in any one of the thirty-fifth aspect or the possible implementations of the thirty-fifth aspect.

According to a forty-fourth aspect, a core network device is provided. The core network device includes a receiver, a transmitter, a processor, a memory, and a bus system. The receiver, the transmitter, the processor, and the memory are connected by using the bus system. The memory is configured to store an instruction, and the processor is configured to execute the instruction stored in the memory, to control the receiver to receive a signal and control the transmitter to send a signal. In addition, when the processor executes the instruction stored in the memory, the execution enables the processor to perform the method in any one of the thirty-sixth aspect or the possible implementations of the thirty-sixth aspect.

According to a forty-fifth aspect, this application provides a computer readable medium, configured to store a computer program. The computer program includes an instruction used to perform the method in any one of the thirty-third aspect or the possible implementations of the thirty-third aspect.

According to a forty-sixth aspect, a computer readable medium is provided, and is configured to store a computer program. The computer program includes an instruction used to perform the method in any one of the thirty-fourth aspect or the possible implementations of the thirty-fourth aspect.

According to a forty-seventh aspect, a computer readable medium is provided, and is configured to store a computer program. The computer program includes an instruction used to perform the method in any one of the thirty-fifth aspect or the possible implementations of the thirty-fifth aspect.

According to a forty-eighth aspect, a computer readable medium is provided, and is configured to store a computer program. The computer program includes an instruction used to perform the method in any one of the thirty-sixth aspect or the possible implementations of the thirty-sixth aspect.

BRIEF DESCRIPTION OF DRAWINGS

To describe the technical solutions in embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
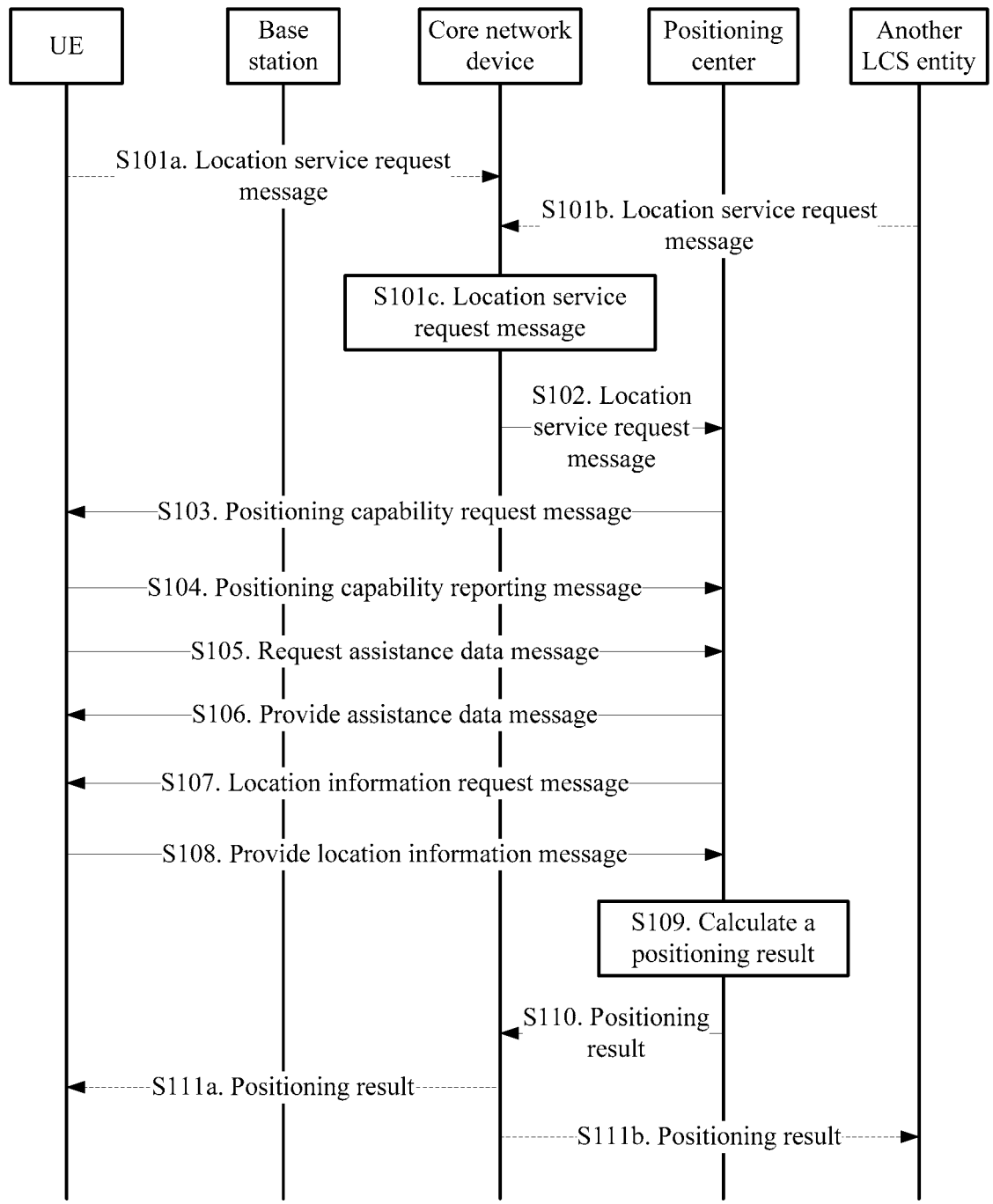
FIG. 1 is a schematic flowchart of a positioning method.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A location service (LCS) service means that a mobile communications system obtains geographic location information (such as longitudinal and latitudinal coordinates) of a mobile terminal by using a specific positioning technology, provides the geographic location information to a mobile user, a communications system, or a third-party positioning client, and provides a call or non-call service related to a location of the mobile user for the mobile user with the support of specific electronic map information.

Network elements related to the LCS service mainly include UE, a base station, a core network device, and a positioning center.

The positioning center may be an entity such as an Evolved Serving Mobile Location Center (E-SMLC) or a gateway mobile location center (GMLC). A main function of the positioning center is to select a positioning method for estimating and calculating a final result, accuracy, and the like for a returned location, so that UE or an LCS entity different from the UE can obtain location information of the UE.

The core network device may include a Cellular Internet of Things serving gateway (C-SGN), a mobility management entity (MME), a serving gateway (S-GW), a packet data serving gateway (P-GW), and the like.

The base station may be a base transceiver station (BTS) in a Global System for Mobile Communications (GSM) or a Code Division Multiple Access (CDMA) system, a NodeB (NodeB) in a Wideband Code Division Multiple Access (WCDMA) system, an evolved NodeB (Evolved NodeB, eNB or eNodeB) in an LTE system, a base station device or a small cell device on a future 5G network, or the like. This is not limited in the present invention.

Usually, the user equipment may also be referred to as a terminal device. The UE may communicate with one or more core network devices by using a radio access network (RAN). The UE may also be referred to as an access terminal, a subscriber unit, a subscriber station, a mobile station, a mobile console, a remote station, a remote terminal, a mobile device, a user terminal, a terminal, a wireless communications device, a user agent, or a user apparatus. The UE may be a cellular phone, a cordless phone, a Session Initiation Protocol (SIP) phone, a wireless local loop (WLL) station, a personal digital assistant (PDA), a handheld device or computing device with a wireless communications function or another processing device connected to a wireless modem, an in-vehicle device, a wearable device, user equipment on a future 5G network, or the like.

FIG. 1 is a schematic flowchart of a positioning method. The following briefly describes the positioning method shown in FIG. 1.

S101*a*. UE sends a location service request message to a core network device.

S101*b*. Another LCS entity (different from the UE) sends a location service request message to the core network device.

S101*c*. The core network device triggers a location service request message.

With reference to S101*a*, S101*b*, and S101*c*, the location service request message may be from the UE or the another LCS entity different from the UE, or may be triggered by the core network device itself. The UE, the LCS entity, or the core network device may request, by using the location service request message, to obtain location information of the UE.

S102. The core network device sends the location service request message to a positioning center.

Regardless of which network node triggers the location service request message, the location service request message is finally sent by the core network device to the positioning center.

S103. The positioning center sends a positioning capability request message to the UE.

After receiving the location service request message, the positioning center sends the positioning capability request message to the UE, to request a positioning capability of the UE. The positioning capability is mainly a measurement capability of the UE. For details, refer to the prior art. For brevity, details are not described herein. Optionally, the positioning center may not request capability information, and the UE reports the capability information by itself.

S104. The UE sends a positioning capability reporting message to the positioning center.

In response to the positioning capability request from the positioning center, the UE reports the positioning capability reporting message to the positioning center, to inform the positioning center of the positioning capability of the UE.

S105. The UE sends a request assistance data message to the positioning center.

After sending the positioning capability reporting message to the positioning center, the UE may request assistance data from the positioning center. The UE may request the following information by using the request assistance data message: information about a reference cell, including a physical cell identifier (PCI), an E-UTRAN cell global identifier (E-CGI), a frequency, positioning reference signal (PRS) configuration, and other information of the reference cell; and a neighboring cell information list including a PCI, an E-CGI, a frequency, PRS configuration, and other information of each neighboring cell. The selected reference cell is not limited to a serving cell, and the neighboring cell information list includes some easy-to-measure neighboring cells selected based on pre-estimation on a location of the UE.

S106. The positioning center sends a provide assistance data message to the UE.

The positioning center sends the provide assistance data message to the UE, to perform measurement configuration on the UE. The provide assistance data message may include the following information: information about a reference cell, including a PCI, an E-UTRAN cell global identifier (E-CGI), a frequency, PRS configuration, and other information of the reference cell; and information about a neighboring cell, including a neighboring cell information list including a PCI, an E-CGI, a frequency, to-be-measured signal configuration or reference signal configuration, and other information of each neighboring cell. The selected reference cell is not limited to a serving cell, and the neighboring cell information list includes some easy-to-measure neighboring cells selected based on pre-estimation on a location of the UE.

S107. The positioning center sends a location information request message to the UE.

The positioning center sends the location information request message to the UE, to request a related measurement result.

S108. The UE sends a provide location information message to the positioning center.

After receiving the location information request message, the UE sends the related measurement result to the positioning center within a period by using the provide location information message.

S109. The positioning center calculates a positioning result based on the provide location information message.

The positioning center calculates the location information of the UE based on the measurement result of the UE and other inputs.

S110. The positioning center sends the positioning result (location information) to the core network device.

S111a. The core network device sends the positioning result to the UE.

If the location service request is triggered by the UE, the core network device sends the positioning result to the UE.

S111b. The core network device sends the positioning result to an EPC LCS entity.

If the location service request is triggered by the another LCS entity, the core network device sends the positioning result to the another LCS.

In the prior-art positioning manner, for example, in the positioning manner shown in FIG. 1, when the UE has relatively poor coverage, the UE still needs to perform measurement based on positioning measurement configuration of the positioning center, and report the location information. However, when positioning accuracy permits, it may be not necessary to report some location information of the UE. In other words, the positioning measurement configuration of the positioning center may be unsuitable for the UE in this case, and the positioning center needs to perform proper positioning measurement configuration on the UE. The present invention provides an information transmission method, so that a positioning center can perform proper positioning measurement configuration on UE based on coverage of the UE. The following describes the information transmission method according to the present invention.

Figure 2:
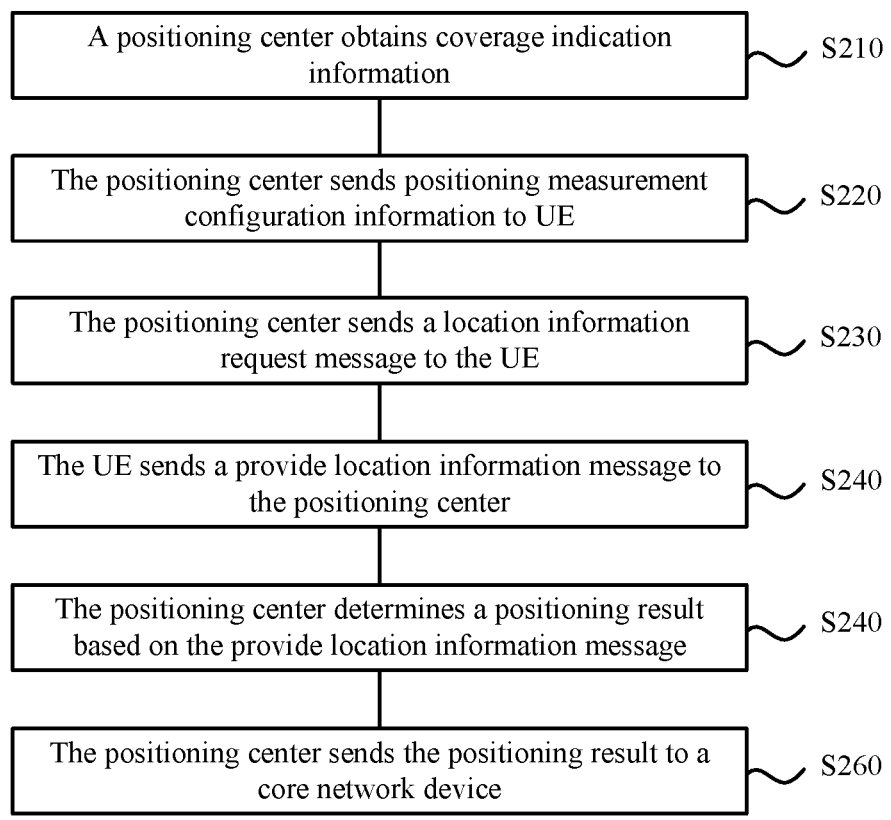
FIG. 2 is a schematic flowchart of an information transmission method according to an embodiment of the present invention.

FIG. 2 is a schematic flowchart of an information transmission method according to an embodiment of the present invention.

S210. A positioning center obtains coverage indication information.

The following describes in detail the coverage indication information.

The coverage indication information may be used to indicate a coverage enhancement level of UE. For details about the coverage enhancement level, refer to the prior art. Details are not described herein. For ease of description, the following describes in detail the related embodiments of the present invention by using an example in which a higher coverage enhancement level indicates poorer coverage of the UE.

In addition, the coverage indication information may be used to indicate that the UE is at a low coverage enhancement level. When the coverage enhancement level of the UE is higher than a specific coverage enhancement level, it may be considered that the UE is at the low coverage enhancement level. For example, there are three coverage enhancement levels: 0, 1, and 2. A larger number indicates poorer coverage of the UE. When the coverage enhancement level of the UE is greater than or equal to 1, that is, the coverage enhancement level of the UE is 1 or 2, it is considered that the UE is at a low coverage enhancement level. The positioning center may determine, based on the coverage indication information, that the UE has relatively poor coverage.

In addition, the coverage indication information may alternatively be used to indicate that the UE requests to reduce a quantity of to-be-measured cells. When the UE has relatively poor coverage, the UE may request, by using the coverage indication information, the positioning center to reduce a quantity of cells that are to be measured by the UE.

In this embodiment of the present invention, the positioning center may obtain the coverage indication information in two manners: Manner 1 and Manner 2. The following describes in detail Manner 1 and Manner 2.

Manner 1:

The positioning center receives the coverage indication information sent by a core network device. In other words, the positioning center may obtain the coverage indication information from the core network device. As an example instead of a limitation, the core network device may proactively send the coverage indication information to the positioning center. In an implementation, the core network device may add the coverage indication information to a location service request message sent to the positioning center. As an example instead of a limitation, the core network device may alternatively send the coverage indication information after the positioning center requests the coverage indication information.

The coverage indication information sent by the core network device to the positioning center may be obtained from a base station. In a connected mode, the base station may determine the coverage of the UE based on a data transmission status, and determine the coverage indication information based on the coverage of the UE. For example, the base station may determine the coverage of the UE based on a quantity of times that data is repeatedly sent to the UE, a response time of the UE, and the like. Usually, a larger quantity of times that the base station repeatedly sends data to the UE and a longer response time of the UE indicate poorer coverage of the UE. In addition, the UE may implicitly or explicitly indicate the coverage enhancement level of the UE to the base station. For example, the UE may explicitly indicate, in a random access request sent to the base station, the coverage indication information. For a specific manner in which the base station implicitly or explicitly indicates the coverage enhancement level of the UE, refer to the prior art. Details are not described herein. After determining the coverage enhancement level of the UE, the base station may determine the coverage indication information based on the coverage enhancement level.

For example, the base station may proactively send the coverage indication information to the core network device after determining the coverage indication information. Specifically, the base station may add the coverage indication information to an initial UE message or a UE context resume request message sent to the core network device. For another example, the base station may alternatively send the coverage indication information to the core network device after the core network device requests the coverage indication information. Specifically, the core network device first sends a coverage request message to the base station, to request the coverage indication information. After receiving the coverage request message, the base station sends a coverage request response message in response to the coverage request message to the core network device, where the coverage request response message carries the coverage indication information.

Specifically, the base station obtains coverage level information of the UE by using a random access procedure of the UE, and then, the base station determines the coverage indication information and sends the coverage indication information to the core network device by using an initial UE context message or another uplink S1AP message. The core network device adds the coverage indication information to a location service request sent to the positioning center, so that the positioning center performs corresponding configuration. When the UE is in a connected mode, a coverage level of the UE changes, and the base station determines the coverage indication information after obtaining changed coverage level information of the UE, and sends the coverage indication information to the core network device by using an uplink S1AP message. The specific message may be a new message such as a UE coverage information transfer message, or an existing message such as a UE capability information indication (UE capability info indication) message. After receiving a location service request, the core network device sends the coverage indication information to the positioning center by using a location service request message, and the positioning center performs related configuration.

For example, the core network device sends a solicit coverage indication information request to the base station after receiving a positioning service request or the location service request or determining to make a request by itself, and the base station adds a coverage indication information to the response message. After receiving the response message, the core network device sends the coverage indication information to the positioning center by using the location service request message.

The base station may alternatively send the coverage indication message to the core network device after the coverage level of the UE changes, and the core network device forwards the coverage indication message to the positioning center.

Manner 2:

The positioning center receives the coverage indication information sent by the UE. In other words, the positioning center may obtain the coverage indication information from the UE.

As an example instead of a limitation, the UE may add the coverage indication information to a positioning capability reporting message sent to the positioning center. In this scheme, the UE may proactively send the positioning capability reporting message, to report the coverage indication information. Further, the UE may alternatively report the coverage indication information when the positioning center requests the coverage indication information. Specifically, the positioning center may first send a positioning capability request message to the UE, to request the coverage indication information. The UE adds the coverage indication information to the reported positioning capability reporting message based on the request from the positioning center.

As an example instead of a limitation, the UE may add the coverage indication information to a request assistance data message sent to the positioning center.

With reference to Manner 1 and Manner 2, it can be learned that in this embodiment of the present invention, the UE and the core network device may transmit the coverage indication information by using signaling in an existing protocol.

In Manner 1 and Manner 2, further, when the UE is in the connected mode, if the coverage enhancement level of the UE changes, the UE may send changed-coverage indication information to the positioning center, to indicate a changed coverage enhancement level. Alternatively, when the base station finds that the coverage enhancement level of the UE changes, the base station may send changed-coverage indication information to the positioning center through forwarding performed by the core network device, to indicate a changed coverage enhancement level. The base station or the UE may send the changed-coverage indication information by using an existing S1 message. This is not specially limited in this embodiment of the present invention. After receiving the changed-coverage indication information and the location service request, the positioning center may perform configuration on the UE based on the changed coverage enhancement level.

S220. The positioning center sends positioning measurement configuration information to UE. The positioning measurement configuration information is used to perform positioning measurement configuration on the UE. Specifically, after receiving the coverage indication information, the positioning center may determine the positioning measurement configuration information based on the coverage indication information.

As an example instead of a limitation, the positioning center may determine, based on the coverage indication information, the quantity of cells that are to be measured by the UE.

For example, the positioning center may limit a maximum quantity of to-be-measured cells or set an upper limit of a quantity of to-be-measured cell based on different coverage enhancement levels. When determining the coverage enhancement level of the UE by using the coverage indication information, the positioning center may set, based on the coverage enhancement level, the quantity of cells that are to be measured by the UE. For example, when the coverage enhancement level of the UE is 0, the positioning center may set, to 8 to 24, the quantity of cells that are to be measured by the UE; when the coverage enhancement level of the UE is 1, the positioning center may set the quantity of cells that are to be measured by the UE to 8 to 15; or when the coverage enhancement level of the UE is 2, the positioning center may set the quantity of cells that are to be measured by the UE to 8 to 11.

For example, when determining, by using the coverage indication information, that the UE is at the low coverage enhancement level or the UE requests to reduce the quantity of to-be-measured cells, the positioning center may configure, when positioning accuracy permits, the UE to measure a relatively small quantity of cells. For example, the positioning center may configure, as a quantity of cells that the UE currently needs to measure, a quantity of cells that the UE needs to measure when the coverage enhancement level is 2. It should be understood that an example is merely used for description herein, and this is not specifically limited in this embodiment of the present invention.

As an example instead of a limitation, the positioning center may determine, based on the coverage indication information, a response time for the UE to respond to a location information request message. For a convenient and brief description, the response time for the UE to respond to a location information request message is simply referred to as a response time in the following.

Specifically, the positioning center may set an appropriate response time based on different coverage levels. A higher coverage level indicates a longer response time. When the UE is at the low coverage enhancement level, or when the UE requests to reduce the quantity of to-be-measured cells, the positioning center may set a relatively long response time for the UE, to ensure that the UE can complete current measurement.

As an example instead of a limitation, the positioning center may determine, based on the coverage indication information, information about a frequency to be measured by the UE.

Specifically, when the UE has relatively poor coverage, the positioning center may configure the UE to measure an intra-frequency cell only. The positioning center configures, by using the positioning measurement configuration information, a frequency of a cell to be measured by the UE.

As an example instead of a limitation, the positioning center may transmit the positioning measurement configuration information by using signaling in an existing protocol. Specifically, the positioning center may send a provide assistance data message to the UE, and send the positioning measurement configuration information to the UE. In other words, the provide assistance data message may carry the positioning measurement configuration information. In this way, the UE may obtain the positioning measurement configuration information when receiving the provide assistance data message.

Optionally, the method may further include the following steps:

S230. The positioning center sends a location information request message to the UE, to request the UE to send a measurement report.

Specifically, after receiving the positioning measurement configuration information, the UE performs measurement based on the positioning measurement configuration information. For example, the UE may measure only the intra-frequency cell configured by the positioning center, or the UE may measure only cells of a quantity that is required by the positioning center.

S240. The UE sends a provide location information message to the positioning center.

Specifically, after completing cell measurement based on the positioning measurement configuration information, the UE sends the measurement report to the positioning center within the response time configured by the positioning center.

S250. The positioning center determines a positioning result based on the provide location information message.

The positioning center determines location information of the UE, namely, the positioning result, based on the measurement report of the UE.

S260. The positioning center sends the positioning result to a core network device.

After receiving the positioning result, the core network device sends the positioning result to a network element requesting a location service.

According to the information transmission method in this embodiment of the present invention, the positioning center can perform more flexible measurement configuration on the UE based on the coverage of the UE or based on a request made by the UE to reduce the quantity of to-be-measured cells. For example, when the UE performs positioning measurement at a relatively high coverage enhancement level or at the low coverage enhancement level, the positioning center may reduce, by reducing the quantity of cells that are to be measured by the UE, a quantity of measurement reports that are to be reported by the UE, so that power consumption of the UE and a delay of reporting the measurement reports by the UE can be reduced. In addition, the positioning center configures the appropriate response time or configures the UE to measure the intra-frequency cell. This can ensure that the UE completes current positioning measurement in relatively poor coverage, with no need to trigger next measurement, thereby improving efficiency, reducing signaling overheads, and further reducing the power consumption.

In this embodiment of the present invention, the UE or the base station may provide a cell list to the positioning center, and after receiving the cell list, the positioning center may perform measurement configuration based on the received cell list. In this way, the positioning center does not need to maintain, by itself or through manual work, a cell list to configure a range of to-be-measured cells. The provided cell list may include cell information of a serving cell or a neighboring cell, or may include configuration information such as configuration information of a reference symbol. In this way, measurement configuration can also be performed relatively accurately by using the provided cell list, with no need to configure some cells that are relatively far away from the UE or have little impact on the positioning result. The cell list may be provided by using an existing message such as an OTDOA/UTDOA information response or update message (OTDOA/UTDOA INFORMATION RESPONSE) (OTDOA/UTDOA INFORMATION UPDATE) or another message, or by using a new message. This is not specifically limited.

Figure 3:
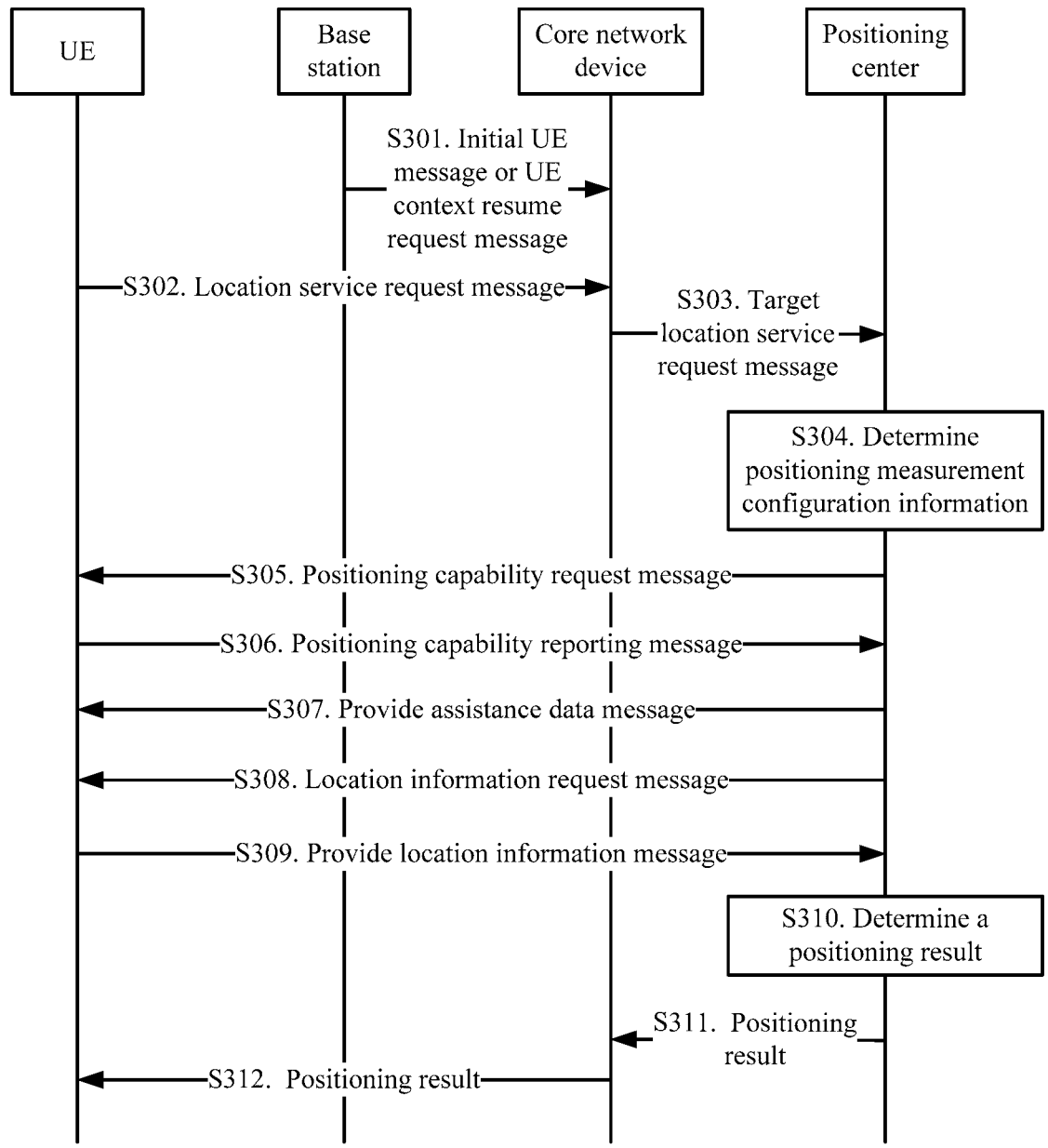
FIG. 3 is a schematic flowchart of an information transmission method according to an embodiment of the present invention.
Figure 4:
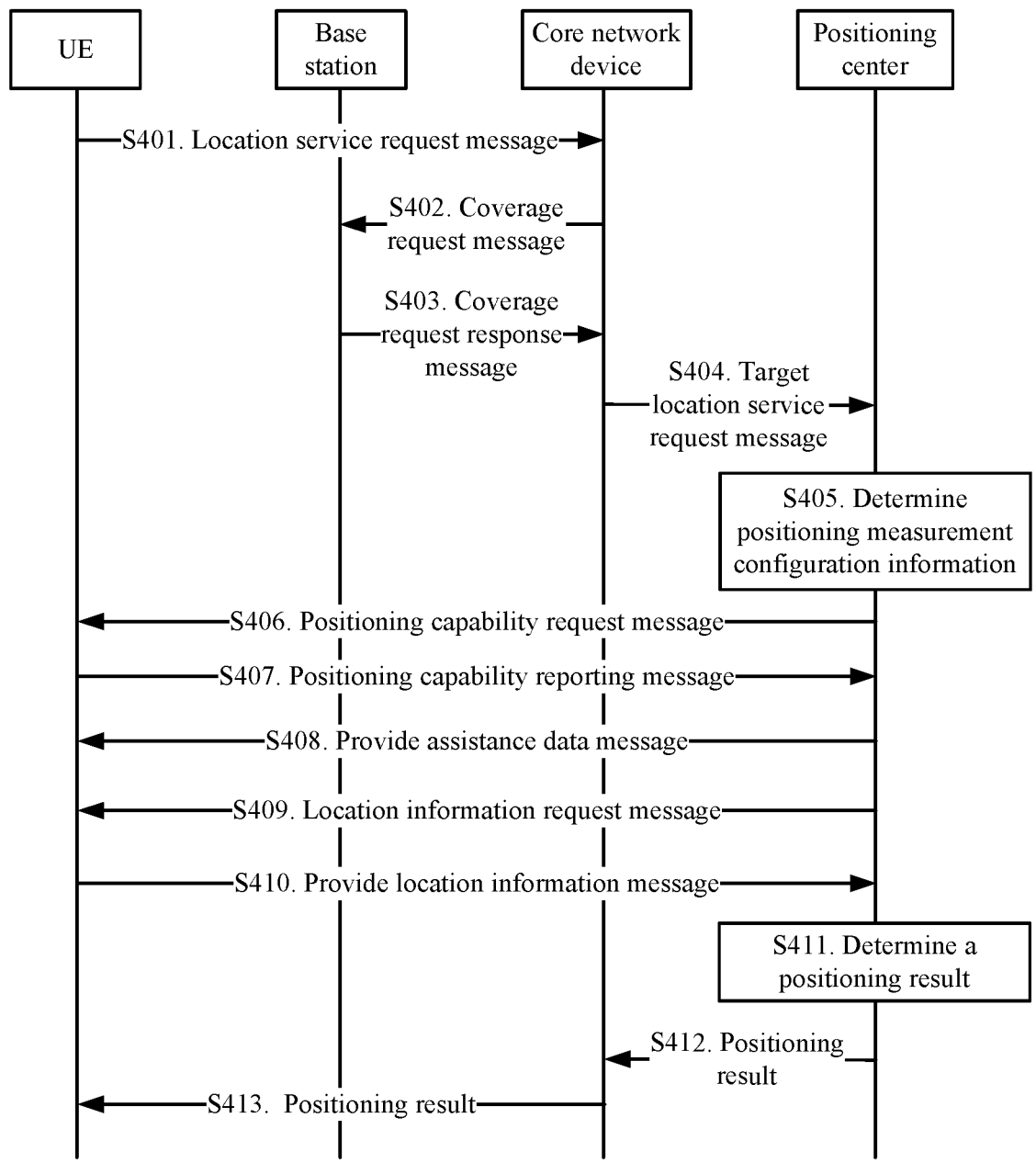
FIG. 4 is a schematic flowchart of an information transmission method according to an embodiment of the present invention.
Figure 5:
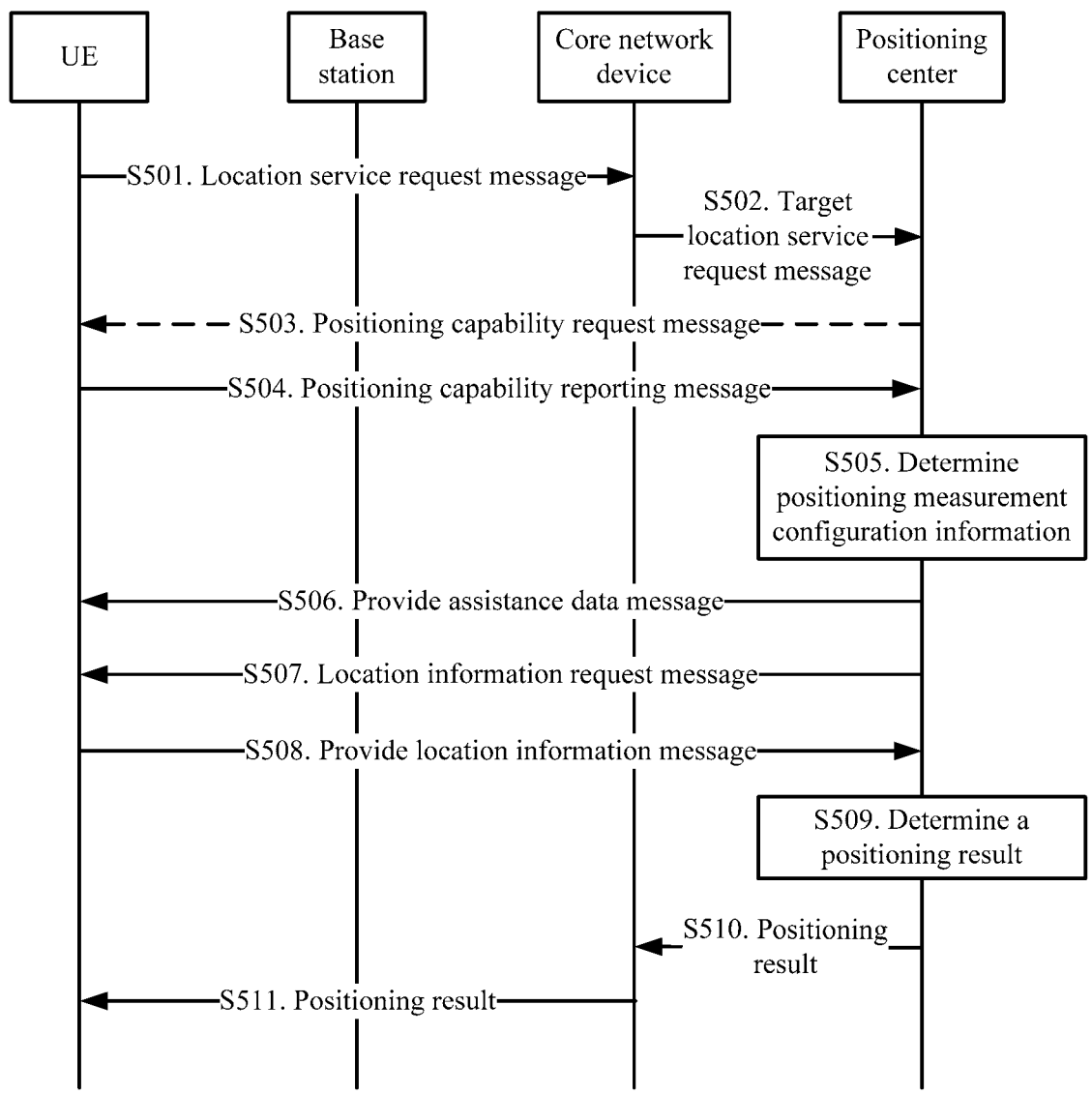
FIG. 5 is a schematic flowchart of an information transmission method according to an embodiment of the present invention.

The following describes in detail the information transmission method in this embodiment of the present invention with reference to FIG. 3 to FIG. 5.

It should be noted that for ease of description, an example in which the UE triggers the location service request is used in the methods shown in FIG. 3 to FIG. 5.

It should be understood that for terms and words described in the following that are the same as those in the foregoing, and steps or operations described in the following that are the same as or have same functions as those in the foregoing, reference may be made to the foregoing descriptions. For brevity, details are not described again in the following.

FIG. 3 is a schematic flowchart of an information transmission method according to an embodiment of the present invention.

S301. A base station sends an initial UE message or a UE context resume request message to a core network device, where the initial UE message or the UE context resume request message carries coverage indication information.

S302. UE sends a location service request message to the core network device.

S303. The core network device sends a location service request message to a positioning center, where the location service request message carries the coverage indication information.

It should be understood that, to distinguish between the location service request message carrying the coverage indication information in this step and the location service request message in S302, the location service request message in S303 is referred to as a target location service request message.

S304. The positioning center determines positioning measurement configuration information based on the coverage indication information after receiving the target location service request message. For details, refer to the description in S220. For brevity, details are not described herein again.

S305. The positioning center sends a positioning capability reporting request message to the UE.

S306. The UE sends a positioning capability reporting response message to the positioning center.

S307. The positioning center sends a provide assistance data message to the UE, where the provide assistance data message carries the positioning measurement configuration information determined in S304.

It should be understood that the provide assistance data message sent by the positioning center to the UE may be proactively sent by the positioning center to the positioning center, or may be a response to a request assistance data message sent by the UE.

S308. The positioning center sends a location information request message to the UE.

S309. The UE sends a provide location information message to the positioning center.

S310. The positioning center determines a positioning result based on the provide location information message.

S311. The positioning center sends the positioning result to the core network device.

S312. The core network device sends the positioning result to the UE.

In the method shown in FIG. 3, the base station proactively sends the coverage indication information to the core network device. Specifically, the base station proactively sends the coverage indication information to the core network device, and after receiving the location service request message from the UE, the core network device sends the coverage indication information to the positioning center by using the target location service request message. The positioning center performs positioning measurement configuration based on the coverage indication information, to configure a related parameter for the UE to perform positioning measurement.

FIG. 4 is a schematic flowchart of an information transmission method according to still another embodiment of the present invention.

S401. UE sends a location service request message to a core network device.

S402. The core network device sends a coverage request message to a base station, to request coverage indication information.

S403. The base station sends a coverage request response message to the core network device in response to the coverage request message, where the coverage request response message carries the coverage indication information.

S404. The core network device sends a location service request message to a positioning center, where the location service request message carries the coverage indication information.

It should be understood that, to distinguish between the location service request message carrying the coverage indication information in this step and the location service request message in S401, the location service request message in S404 is referred to as a target location service request message.

S405. The positioning center determines positioning measurement configuration information based on the coverage indication information after receiving the target location service request message. For details, refer to the description in S220. For brevity, details are not described herein again.

S406. The positioning center sends a positioning capability reporting request message to the UE.

S407. The UE sends a positioning capability reporting response message to the positioning center.

S408. The positioning center sends a provide assistance data message to the UE, where the provide assistance data message carries the positioning measurement configuration information determined in S405.

It should be understood that the provide assistance data message sent by the positioning center to the UE may be proactively sent by the positioning center to the positioning center, or may be a response to a request assistance data message sent by the UE.

S409. The positioning center sends a location information request message to the UE.

S410. The UE sends a provide location information message to the positioning center.

S411. The positioning center determines a positioning result based on the provide location information message.

S412. The positioning center sends the positioning result to the core network device.

S413. The core network device sends the positioning result to the UE.

In the method shown in FIG. 4, the base station sends the coverage indication information to the core network device when the core network device requests the coverage indication information. Specifically, the core network device first requests the coverage indication information from the base station after receiving the location service request message from the UE, and the base station then sends the coverage indication information to the core network device. The core network device sends the coverage indication information to the positioning center by using the target location service request message. The core network device performs positioning measurement configuration based on the coverage indication information, to configure a related parameter for the UE to perform positioning measurement.

FIG. 5 is a schematic flowchart of an information transmission method according to still another embodiment of the present invention.

S501. UE sends a location service request message to a core network device.

S502. The core network device sends a location service request message to a positioning center, where the location service request message carries coverage indication information.

It should be understood that, to distinguish between the location service request message carrying the coverage indication information in this step and the location service request message in S501, the location service request message in S502 is referred to as a target location service request message.

S504. The UE sends a positioning capability reporting response message to the positioning center, where the capability reporting response message carries the coverage indication information.

In this embodiment of the present invention, before S504, the method may further include the following step: S503. The positioning center sends a positioning capability reporting request message to the UE.

The positioning capability reporting request message may be used to request the coverage indication information. The UE adds the coverage indication information to the positioning capability reporting response message after receiving the positioning capability reporting request message.

S505. The positioning center determines positioning measurement configuration information based on the coverage indication information after receiving the positioning capability reporting response message. For details, refer to the description in S220. For brevity, details are not described herein again.

S506. The positioning center sends a provide assistance data message to the UE, where the provide assistance data message carries the positioning measurement configuration information determined in S505.

It should be understood that the provide assistance data message sent by the positioning center to the UE may be proactively sent by the positioning center to the positioning center, or may be a response to a request assistance data message sent by the UE.

S507. The positioning center sends a location information request message to the UE.

S508. The UE sends a provide location information message to the positioning center.

S509. The positioning center determines a positioning result based on the provide location information message.

S510. The positioning center sends the positioning result to the core network device.

S511. The core network device sends the positioning result to the UE.

In the method shown in FIG. 5, the positioning center obtains the coverage indication information from the UE. Specifically, the UE proactively sends the coverage indication information to the positioning center by using the positioning capability reporting response message. Alternatively, the UE sends the coverage indication information to the positioning center after the positioning center requests the coverage indication information. The positioning center performs positioning measurement configuration based on the coverage indication information, to configure a related parameter for the UE to perform positioning measurement.

The foregoing describes in detail the information transmission methods according to the embodiments of the present invention with reference to FIG. 1 to FIG. 5. The following describes an information transmission device according to the embodiments of the present invention with reference to FIG. 6 to FIG. 13.

Figure 6:
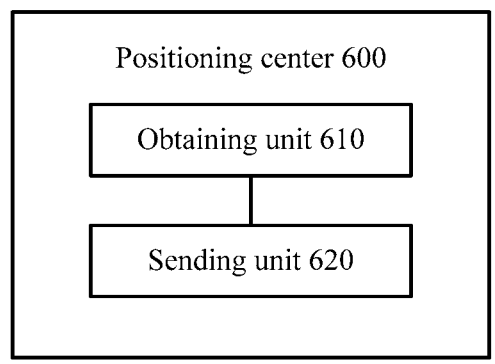
FIG. 6 is a schematic block diagram of a positioning center 600 according to an embodiment of the present invention.

FIG. 6 is a schematic block diagram of a positioning center 600 according to an embodiment of the present invention. As shown in FIG. 6, the positioning center 600 includes an obtaining unit 610 and a sending unit 620.

The obtaining unit 610 is configured to obtain coverage indication information, where the coverage indication information is used to indicate a coverage enhancement level of user equipment UE, indicate that the UE is at a low coverage enhancement level, or indicate that the UE requests to reduce a quantity of to-be-measured cells.

The sending unit 620 is configured to send the positioning measurement configuration information to the UE, where the positioning measurement configuration information is determined by the positioning center based on the coverage indication information, and the positioning measurement configuration information is used to perform positioning measurement configuration on the UE.

The units and the foregoing other operations or functions of the positioning center 600 according to this embodiment of the present invention are used to perform a corresponding procedure performed by the positioning center in the foregoing methods. For brevity, details are not described herein.

Therefore, the positioning center according to this embodiment of the present invention can perform more flexible measurement configuration on the UE based on coverage of the UE or based on a request made by the UE to reduce the quantity of to-be-measured cells. For example, when the UE performs positioning measurement at a relatively high coverage enhancement level or at the low coverage enhancement level, the positioning center may reduce, by reducing the quantity of cells that are to be measured by the UE, a quantity of measurement reports that are to be reported by the UE, so that power consumption of the UE and a delay of reporting the measurement reports by the UE can be reduced. In addition, the positioning center configures an appropriate response time or configures the UE to measure an intra-frequency cell. This can ensure that the UE completes current positioning measurement in relatively poor coverage, with no need to trigger next measurement, thereby improving efficiency, reducing signaling overheads, and further reducing the power consumption.

Figure 7:
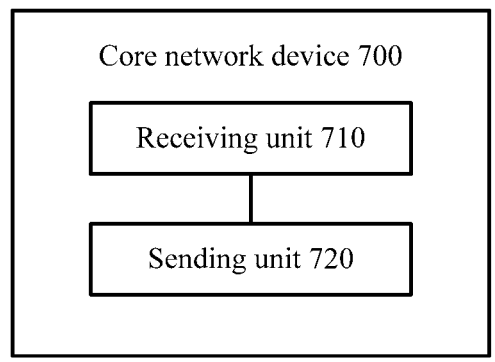
FIG. 7 is a schematic block diagram of a core network device 700 according to an embodiment of the present invention.

FIG. 7 is a schematic block diagram of a core network device 700 according to an embodiment of the present invention. As shown in FIG. 7, the core network device 700 includes a receiving unit 710 and a sending unit 720.

The receiving unit 710 is configured to receive coverage indication information sent by a base station, where the coverage indication information is used to indicate a coverage enhancement level of user equipment UE, indicate that the UE is at a low coverage enhancement level, or indicate that the UE requests to reduce a quantity of to-be-measured cells.

The sending unit 720 is configured to send the coverage indication information to a positioning center, so that the positioning center performs positioning measurement configuration on the UE based on the coverage indication information.

The units and the foregoing other operations or functions of the core network device 700 according to this embodiment of the present invention are used to perform a corresponding procedure performed by the core network device in the foregoing methods. For brevity, details are not described herein.

Therefore, the core network device according to this embodiment of the present invention sends the coverage indication information to the positioning center, so that the positioning center can perform more flexible measurement configuration on the UE based on coverage of the UE or based on a request made by the UE to reduce the quantity of to-be-measured cells.

Figure 8:
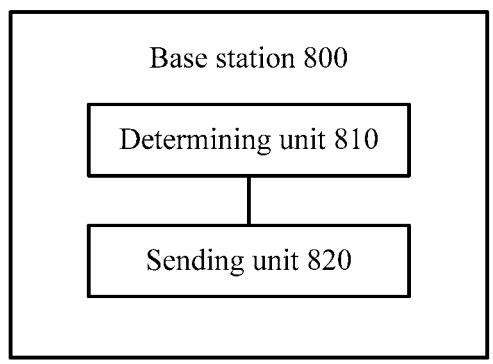
FIG. 8 is a schematic block diagram of a base station 800 according to an embodiment of the present invention.

FIG. 8 is a schematic block diagram of a base station 800 according to an embodiment of the present invention. As shown in FIG. 8, the base station 800 includes a determining unit 810 and a sending unit 820.

The determining unit 810 is configured to determine coverage indication information based on a coverage enhancement level of user equipment UE, where the coverage indication information is used to indicate the coverage enhancement level of the UE, indicate that the UE is at a low coverage enhancement level, or indicate that the UE requests to reduce a quantity of to-be-measured cells.

The sending unit 820 is configured to send the coverage indication information to a core network device.

The units and the foregoing other operations or functions of the base station 800 according to this embodiment of the present invention are used to implement a corresponding procedure performed by the base station in the foregoing methods. For brevity, details are not described herein.

Therefore, the base station according to this embodiment of the present invention can determine the coverage indication information based on the coverage enhancement level of the UE, and can send the coverage indication information to the core network device.

Figure 9:
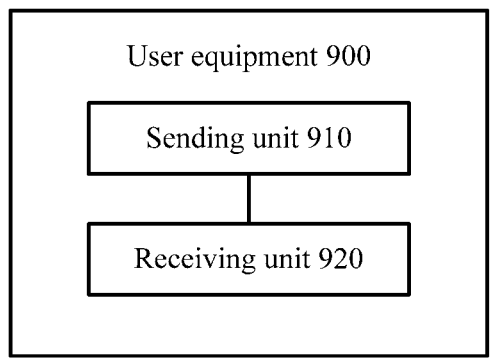
FIG. 9 is a schematic block diagram of user equipment 900 according to an embodiment of the present invention.

FIG. 9 is a schematic block diagram of user equipment 900 according to an embodiment of the present invention. As shown in FIG. 9, the user equipment 900 includes a sending unit 910 and a receiving unit 920.

The sending unit 910 is configured to send coverage indication information to a positioning center, where the coverage indication information is used to indicate a coverage enhancement level of the UE, indicate that the UE is at a low coverage enhancement level, or indicate that the UE requests to reduce a quantity of to-be-measured cells.

The receiving unit 920 is configured to receive positioning measurement configuration information sent by the positioning center based on the coverage indication information, where the positioning measurement configuration information is used to perform positioning measurement configuration on the UE.

The units and the foregoing other operations or functions of the user equipment 900 according to this embodiment of the present invention are used to implement a corresponding procedure performed by the UE in the foregoing methods. For brevity, details are not described herein.

Therefore, the UE according to this embodiment of the present invention sends the coverage indication information to the positioning center, so that the positioning center can perform more flexible measurement configuration on the UE based on coverage of the UE or based on a request made by the UE to reduce the quantity of to-be-measured cells. For example, when the UE performs positioning measurement at a relatively high coverage enhancement level or at the low coverage enhancement level, the positioning center may reduce, by reducing the quantity of cells that are to be measured by the UE, a quantity of measurement reports that are to be reported by the UE, so that power consumption of the UE and a delay of reporting the measurement reports by the UE can be reduced. In addition, the positioning center configures an appropriate response time or configures the UE to measure an intra-frequency cell. This can ensure that the UE completes current positioning measurement in relatively poor coverage, with no need to trigger next measurement, thereby improving efficiency, reducing signaling overheads, and further reducing the power consumption.

Figure 10:
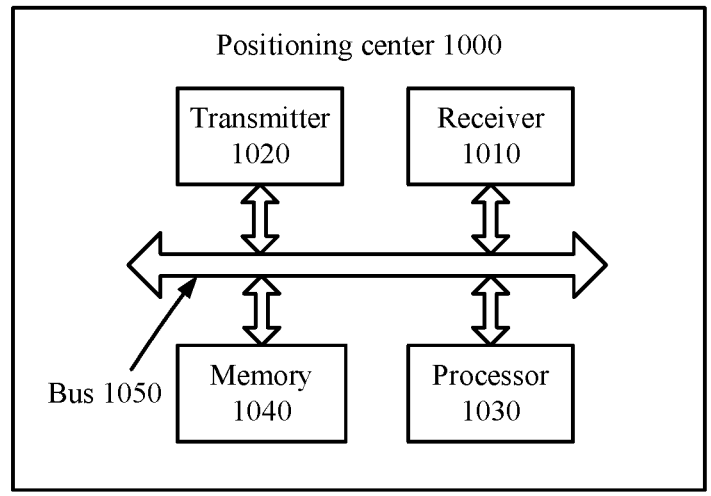
FIG. 10 is a schematic structural diagram of a positioning center 1000 according to an embodiment of the present invention.

FIG. 10 is a schematic structural diagram of a positioning center 1000 according to an embodiment of the present invention. As shown in FIG. 10, the positioning center 1000 includes a receiver 1010, a transmitter 1020, a processor 1030, a memory 1040, and a bus system 1050. The receiver 1010, the transmitter 1020, the processor 1030, and the memory 1040 are connected by using the bus system 1050. The memory 1040 is configured to store an instruction, and the processor 1030 is configured to execute the instruction stored in the memory 1040, to control the receiver 1010 to receive a signal and control the transmitter 1020 to send a signal.

The processor 1030 is configured to obtain coverage indication information, where the coverage indication information is used to indicate a coverage enhancement level of user equipment UE, indicate that the UE is at a low coverage enhancement level, or indicate that the UE requests to reduce a quantity of to-be-measured cells.

The transmitter 1020 is configured to send the positioning measurement configuration information to the UE, where the positioning measurement configuration information is determined by the positioning center based on the coverage indication information, and the positioning measurement configuration information is used to perform positioning measurement configuration on the UE.

It should be understood that in this embodiment of the present invention, the processor 1030 may be a central processing unit (central processing unit, "CPU" for short), or the processor 1030 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 1040 may include a read-only memory and a random access memory, and provide an instruction and data to the processor 1030. A part of the memory 1040 may further include a non-volatile random access memory. For example, the memory 1040 may further store information of a device type.

The bus system 1050 may include a power bus, a control bus, a status signal bus, and the like, in addition to a data bus. However, for a clear description, various types of buses in the figure are marked as the bus system 1050.

In an implementation process, steps in the foregoing methods can be implemented by using a hardware integrated logical circuit in the processor 1030, or by using instructions in a form of software. The steps of the information transmission methods with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1040, and the processor 1030 reads information in the memory 1040 and completes the steps in the foregoing methods in combination with hardware of the processor. To avoid repetition, details are not described herein again.

The units and the foregoing other operations or functions of the positioning center 1000 according to this embodiment of the present invention are used to perform a corresponding procedure performed by the positioning center in the foregoing methods. For brevity, details are not described herein.

Therefore, the positioning center according to this embodiment of the present invention can perform more flexible measurement configuration on the UE based on coverage of the UE or based on a request made by the UE to reduce the quantity of to-be-measured cells. For example, when the UE performs positioning measurement at a relatively high coverage enhancement level or at the low coverage enhancement level, the positioning center may reduce, by reducing the quantity of cells that are to be measured by the UE, a quantity of measurement reports that are to be reported by the UE, so that power consumption of the UE and a delay of reporting the measurement reports by the UE can be reduced. In addition, the positioning center configures an appropriate response time or configures the UE to measure an intra-frequency cell. This can ensure that the UE completes current positioning measurement in relatively poor coverage, with no need to trigger next measurement, thereby improving efficiency, reducing signaling overheads, and further reducing the power consumption.

Figure 11:
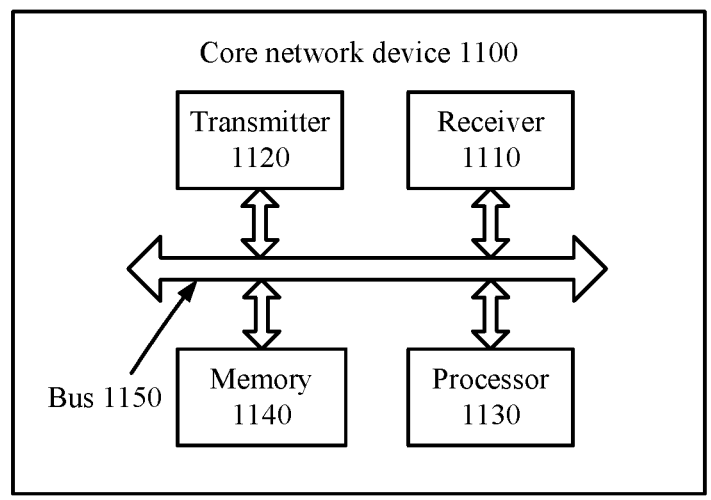
FIG. 11 is a schematic structural diagram of a core network device 1100 according to an embodiment of the present invention.

FIG. 11 is a schematic structural diagram of a core network device 1100 according to an embodiment of the present invention. As shown in FIG. 11, the core network device 1100 includes a receiver 1110, a transmitter 1120, a processor 1130, a memory 1140, and a bus system 1150. The receiver 1110, the transmitter 1120, the processor 1130, and the memory 1140 are connected by using the bus system 1150. The memory 1140 is configured to store an instruction, and the processor 1130 is configured to execute the instruction stored in the memory 1140, to control the receiver 1110 to receive a signal and control the transmitter 1120 to send a signal.

The processor 1110 is configured to receive coverage indication information sent by a base station, where the coverage indication information is used to indicate a coverage enhancement level of user equipment UE, indicate that the UE is at a low coverage enhancement level, or indicate that the UE requests to reduce a quantity of to-be-measured cells.

The transmitter 1120 is configured to send the coverage indication information to a positioning center, so that the positioning center performs positioning measurement configuration on the UE based on the coverage indication information.

It should be understood that in this embodiment of the present invention, the processor 1130 may be a central processing unit (CPU), or the processor 1130 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 1140 may include a read-only memory and a random access memory, and provide an instruction and data to the processor 1130. A part of the memory 1140 may further include a non-volatile random access memory. For example, the memory 1140 may further store information of a device type.

The bus system 1150 may include a power bus, a control bus, a status signal bus, and the like, in addition to a data bus. However, for a clear description, various types of buses in the figure are marked as the bus system 1150.

In an implementation process, steps in the foregoing methods can be implemented by using a hardware integrated logical circuit in the processor 1130, or by using instructions in a form of software. The steps of the information transmission methods with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1140, and the processor 1130 reads information in the memory 1140 and completes the steps in the foregoing methods in combination with hardware of the processor. To avoid repetition, details are not described herein again.

The units and the foregoing other operations or functions of the core network device 1100 according to this embodiment of the present invention are used to perform a corresponding procedure performed by the core network device in the foregoing methods. For brevity, details are not described herein.

Therefore, the core network device according to this embodiment of the present invention sends the coverage indication information to the positioning center, so that the positioning center can perform more flexible measurement configuration on the UE based on coverage of the UE or based on a request made by the UE to reduce the quantity of to-be-measured cells.

Figure 12:
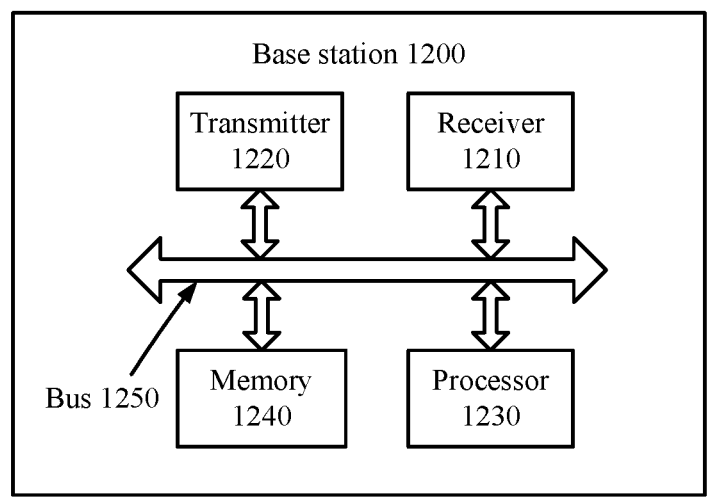
FIG. 12 is a schematic structural diagram of a base station 1200 according to an embodiment of the present invention.

FIG. 12 is a schematic structural diagram of a base station 1200 according to an embodiment of the present invention. As shown in FIG. 12, the base station 1200 includes a receiver 1210, a transmitter 1220, a processor 1230, a memory 1240, and a bus system 1250. The receiver 1210, the transmitter 1220, the processor 1230, and the memory 1240 are connected by using the bus system 1250. The memory 1240 is configured to store an instruction, and the processor 1230 is configured to execute the instruction stored in the memory 1240, to control the receiver 1210 to receive a signal and control the transmitter 1220 to send a signal.

The processor 1230 is configured to determine coverage indication information based on a coverage enhancement level of user equipment UE, where the coverage indication information is used to indicate the coverage enhancement level of the UE, indicate that the UE is at a low coverage enhancement level, or indicate that the UE requests to reduce a quantity of to-be-measured cells.

The transmitter 1220 is configured to send the coverage indication information to a core network device.

It should be understood that in this embodiment of the present invention, the processor 1230 may be a central processing unit (CPU), or the processor 1230 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 1240 may include a read-only memory and a random access memory, and provide an instruction and data to the processor 1230. A part of the memory 1240 may further include a non-volatile random access memory. For example, the memory 1240 may further store information of a device type.

The bus system 1250 may include a power bus, a control bus, a status signal bus, and the like, in addition to a data bus. However, for a clear description, various types of buses in the figure are marked as the bus system 1250.

In an implementation process, steps in the foregoing methods can be implemented by using a hardware integrated logical circuit in the processor 1230, or by using instructions in a form of software. The steps of the information transmission methods with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1240, and the processor 1230 reads information in the memory 1240 and completes the steps in the foregoing methods in combination with hardware of the processor. To avoid repetition, details are not described herein again.

The units and the foregoing other operations or functions of the base station 1200 according to this embodiment of the present invention are used to implement a corresponding procedure performed by the base station in the foregoing methods. For brevity, details are not described herein.

Therefore, the base station according to this embodiment of the present invention can determine the coverage indication information based on the coverage enhancement level of the UE, and can send the coverage indication information to the core network device.

Figure 13:
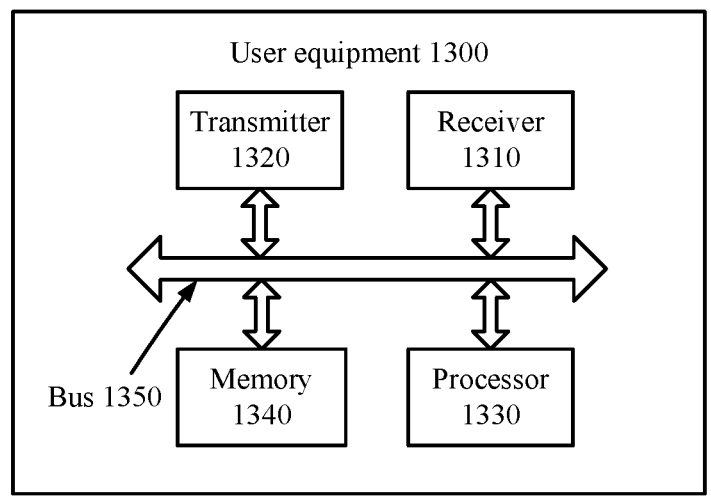
FIG. 13 is a schematic structural diagram of user equipment 1300 according to an embodiment of the present invention.

FIG. 13 is a schematic structural diagram of user equipment 1300 according to an embodiment of the present invention. As shown in FIG. 13, the user equipment 1300 includes a receiver 1310, a transmitter 1320, a processor 1330, a memory 1340, and a bus system 1350. The receiver 1310, the transmitter 1320, the processor 1330, and the memory 1340 are connected by using the bus system 1350. The memory 1340 is configured to store an instruction, and the processor 1330 is configured to execute the instruction stored in the memory 1340, to control the receiver 1310 to receive a signal and control the transmitter 1320 to send a signal.

The transmitter 1320 is configured to send coverage indication information to a positioning center, where the coverage indication information is used to indicate a coverage enhancement level of the UE, indicate that the UE is at a low coverage enhancement level, or indicate that the UE requests to reduce a quantity of to-be-measured cells.

The receiver 1310 is configured to receive positioning measurement configuration information sent by the positioning center based on the coverage indication information, where the positioning measurement configuration is used to perform positioning measurement configuration on the UE.

It should be understood that in this embodiment of the present invention, the processor 1330 may be a central processing unit (CPU), or the processor 1330 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 1340 may include a read-only memory and a random access memory, and provide an instruction and data to the processor 1330. A part of the memory 1340 may further include a non-volatile random access memory. For example, the memory 1340 may further store information of a device type.

The bus system 1350 may include a power bus, a control bus, a status signal bus, and the like, in addition to a data bus. However, for a clear description, various types of buses in the figure are marked as the bus system 1350.

In an implementation process, steps in the foregoing methods can be implemented by using a hardware integrated logical circuit in the processor 1330, or by using instructions in a form of software. The steps of the information transmission methods with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1340, and the processor 1330 reads information in the memory 1340 and completes the steps in the foregoing methods in combination with hardware of the processor. To avoid repetition, details are not described herein again.

The units and the foregoing other operations or functions of the user equipment 1300 according to this embodiment of the present invention are used to implement a corresponding procedure performed by the user equipment in the foregoing methods. For brevity, details are not described herein.

Therefore, the UE according to this embodiment of the present invention sends the coverage indication information to the positioning center, so that the positioning center can perform more flexible measurement configuration on the UE based on coverage of the UE or based on a request made by the UE to reduce the quantity of to-be-measured cells. For example, when the UE performs positioning measurement at a relatively high coverage enhancement level or at the low coverage enhancement level, the positioning center may reduce, by reducing the quantity of cells that are to be measured by the UE, a quantity of measurement reports that are to be reported by the UE, so that power consumption of the UE and a delay of reporting the measurement reports by the UE can be reduced. In addition, the positioning center configures an appropriate response time or configures the UE to measure an intra-frequency cell. This can ensure that the UE completes current positioning measurement in relatively poor coverage, with no need to trigger next measurement, thereby improving efficiency, reducing signaling overheads, and further reducing the power consumption.

The information transmission methods in the present invention are all based on that the UE and the base station are in an RRC connected mode. In other words, before the information transmission methods according to the embodiments of the present invention are performed, the UE and the base station need to establish an RRC connection. The RRC connection herein may be an RRC resume procedure or an RRC re-establishment procedure.

According to the information transmission methods in the embodiments of the present invention, the UE may use either a UP scheme or a CP scheme to re-establish the RRC connection. For a process in which the UE uses the UP scheme to re-establish the RRC connection, refer to the prior art. The following describes a scheme in which the UE uses the CP scheme to re-establish the RRC connection.

Figure 14:
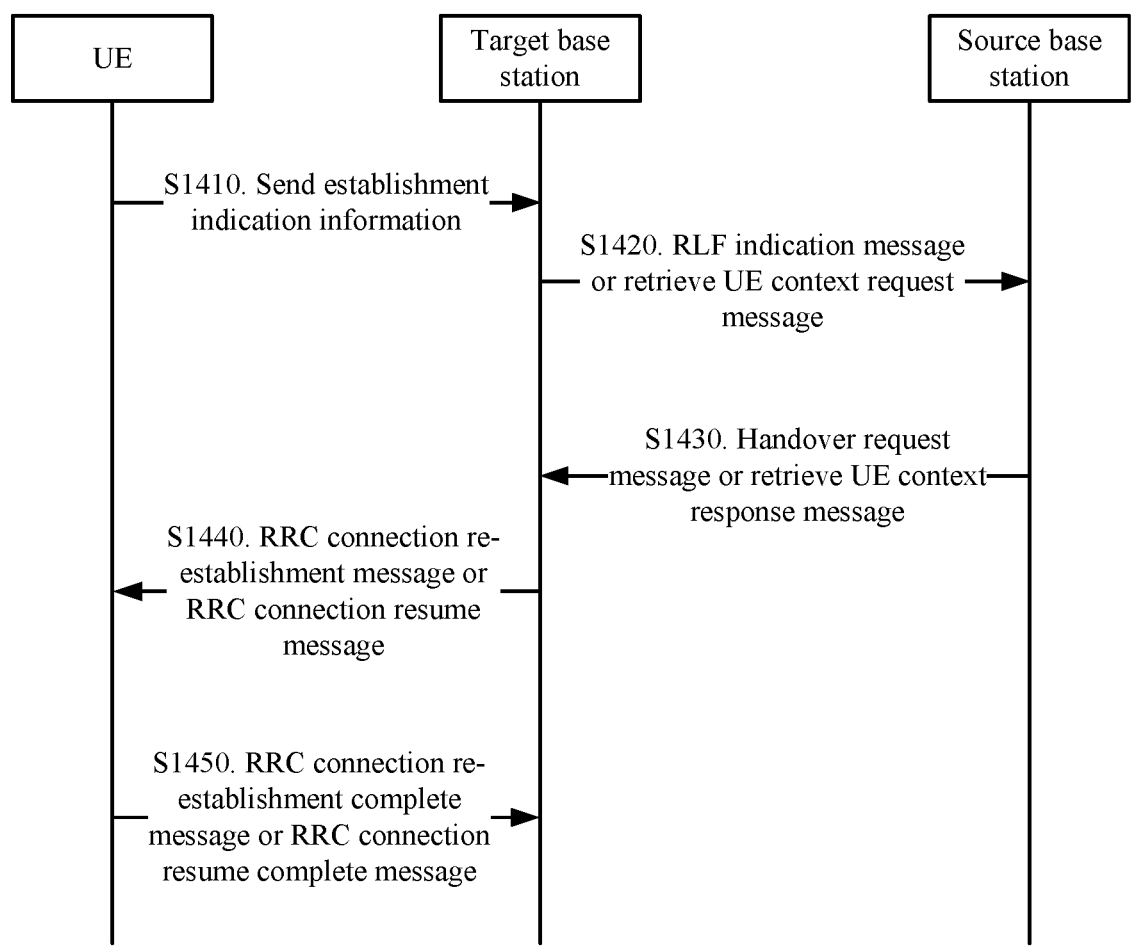
FIG. 14 is a schematic flowchart of an RRC connection method according to an embodiment of the present invention.

FIG. 14 shows a radio resource control RRC connection method.

S1410. UE sends establishment indication information to a target base station, where the establishment indication information is used to indicate, to the target base station, that the UE uses either a control plane CP scheme or a user plane UP scheme to establish an RRC connection.

The UE may use either the CP scheme or the UP scheme when re-establishing or resuming the RRC connection to the target base station. However, the target base station cannot determine which scheme is used by the UE to re-establish (including re-establish and resume) the RRC connection. According to the RRC connection method in this embodiment of the present invention, the UE may make an indication to the target base station, so that the target base station can determine which scheme is used by the UE to establish the RRC connection. In this way, the target base station can determine an operation procedure of obtaining a context of the UE, namely, whether to use a CP-related operation procedure or a UP-related operation procedure. Further, the target base station can obtain the context of the UE by using a corresponding procedure, and establish the RRC connection to the UE.

In this embodiment of the present invention, the UE may send the establishment indication information to the target base station by using an RRC connection re-establishment request message, an RRC connection resume request message, or an RRC connection establishment request message. In other words, the RRC connection re-establishment request message, the RRC connection resume request message, and the RRC connection establishment request message may all carry the establishment indication information.

S1420. The target base station sends an RLF indication message or a retrieve UE context request message (Retrieve UE context request) to a source base station, where the RLF indication message or the retrieve UE context request message includes the establishment indication information. It should be understood that the RLF indication message or the retrieve UE context request message is used to request the context of the UE.

S1430. The source base station sends a handover request message to the target base station based on the RLF indication message, or the source base station sends a retrieve UE context response message to the target base station based on the retrieve UE context request message.

Specifically, the source base station may determine, based on the RLF indication message or the retrieve UE context response message sent by the target base station, whether the UE uses the CP scheme or the UP scheme to establish the RRC connection. After determining that the UE uses the CP scheme or the UP scheme to establish the RRC connection, the source base station identifies and checks the UE based on the corresponding scheme. If the source base station can identify the UE and check the UE successfully, the source base station sends the handover request message or the retrieve UE context response message to the target base station, and sends the context of the UE to the UE.

Optionally, the RRC connection re-establishment request message, the RRC connection resume request message, or the RRC connection establishment request message may further include first identifier information used to identify or check the UE.

As an example instead of a limitation, the first identifier information may include at least one of the following: a hash S-TMSI, a truncated S-TMSI, an M-TMSI, a dedicated user identity, a base station ID, a truncated base station ID, an E-CGI, and an eNB UE S1AP ID. The hash S-TMSI, the truncated S-TMSI, and the M-TMSI are obtained based on an S-TMSI. The hash S-TMSI and the truncated S-TMSI are generated by the UE based on a preset algorithm, and the M-TMSI is formed by last 32 bits of the S-TMSI. The dedicated user identity is a user identity allocated by the source base station to perform addressing and store a context.

In addition, the first identifier information, the RRC connection re-establishment request message, or the RRC connection resume request message may further include parameters such as a cell radio network temporary identifier (C-RNTI) and a PCI.

In this embodiment of the present invention, before sending the dedicated user identity to the target base station, the UE needs to obtain the dedicated user identity. The following describes in detail, with reference to FIG. 15, a method for obtaining the dedicated user identity by the UE.

S1510. The UE and the target base station perform a random access channel (RACH) procedure.

Specifically, the RACH procedure includes: sending, by the UE, a random access request to the target base station, and returning, by the target base station, a random access response to the UE after receiving the random access request. For more details, refer to the prior art. For brevity, details are not described herein.

S1520. The UE and the source base station establish an RRC connection.

The RRC connection herein may be an RRC connection establishment procedure, an RRC connection re-establishment procedure, or an RRC connection resume procedure. This is not limited in this embodiment of the present invention. For a corresponding procedure, refer to the prior art. For brevity, details are not described herein.

S1530. The source base station sends the dedicated user identity to a core network device. For ease of description, the following provides description by using an example in which the core network device is an MME.

The dedicated user identity may be a segment of digital codes randomly generated by the source base station, a related parameter in the prior art, such as an eNB UE S1AP identifier, some truncated identifiers, or the like. It should be understood that the source base station stores the dedicated user identity.

The source base station may send the dedicated user identity to the MME by using an initial UE message, an uplink/downlink NAS transfer message, a UE context resume request message, or the like.

S1540. The MME may send the dedicated user identity to the UE after receiving the dedicated user identity.

The MME may send the dedicated user identity to the UE by using a downlink NAS message. The downlink NAS message may be signaling in an existing protocol, such as a downlink NAS transfer message. This is not limited in this embodiment of the present invention. Specifically, the downlink NAS message carrying the dedicated user identity is sent by the MME to the base station, and then the NAS message carrying the UEID is carried in a downlink direct transfer message sent by the base station to the UE.

S1550. When the UE moves, the UE sends the dedicated user identity to the target base station.

After receiving the dedicated user identity (sent by the MME in a previous connection), the UE stores the dedicated user identity. The UE may send the dedicated user identity to the target base station by using an RRC connection re-establishment request message, an RRC connection resume request message, an RRC connection establishment request message, or the like. The RRC connection re-establishment request message, the RRC connection resume request message, and the RRC connection establishment request message may further include identifiers such as a C-RNTI and a PCI.

In the foregoing procedure, the dedicated user identity allocated by the source base station is sent by the MME to the UE by using the NAS message. This avoids a problem that the dedicated user identity is directly exposed to an air interface and may be intercepted and tampered with.

Optionally, the source base station may identify or check the UE by using the first identifier information. After receiving the first identifier information sent by the UE, the target base station forwards the first identifier information to the source base station. The source base station performs a check, that is, compares whether identifier information stored by the source base station is consistent with related identifier information of the UE that is sent by the target base station. If the identifier information stored by the source base station is consistent with the related identifier information of the UE that is sent by the target base station, the check succeeds, and the source base station sends a related context of the UE to the target base station.

As an example instead of a limitation, the source base station may identify or check the UE by using a hash S-TMSI, a truncated S-TMSI, or an M-TMSI. The source base station identifies or checks the UE based on the stored hash S-TMSI, truncated S-TMSI, or M-TMSI; a received corresponding hash S-TMSI, truncated S-TMSI, or M-TMSI; a base station ID; a truncated base station ID; or the like.

The hash S-TMSI and the truncated S-TMSI that are stored by the source base station are generated by the source base station according to a preset algorithm agreed on with the UE or stipulated by a protocol. The source base station may obtain the S-TMSI in two manners. One manner is that the source base station obtains the S-TMSI from the UE. For example, the source base station may obtain the S-TMSI from the RRC connection establishment request message sent by the UE. In other words, the RRC connection establishment request message may carry the S-TMSI. The other manner is that the source base station obtains the S-TMSI from the MME. Specifically, if the UE does not send the S-TMSI to the source base station when sending the RRC connection establishment request message, the MME may send the S-TMSI to the source base station by using downlink S1-AP signaling in a subsequent procedure. The S1-AP signaling may be a downlink NAS information transfer message, an initial UE context establishment request, or the like. This is not specially limited in this embodiment of the present invention. In addition, if the MME allocates a new S-TMSI to the UE, for example, in a TAU procedure, the UE may send the updated S-TMSI to the source base station by using an uplink RRC message, or the MME sends the updated S-TMSI to the source base station by using a downlink S1 message. The uplink RRC message and the downlink S1 message are not specially limited in this embodiment of the present invention.

As an example instead of a limitation, the source base station may identify or check the UE by using the dedicated user identity. The source base station identifies or checks the UE based on the stored dedicated user identity and the received dedicated user identity. Specifically, if the target base station receives, after receiving a first message carrying a related identifier and the dedicated user identity, such as the RRC re-establishment request message, message that also carries the related identifier, the target base station considers that the message is sent by unauthorized UE, and discards the message. Further, this can ensure accuracy of UE identification and checking by the source base station.

If the source base station identifies or checks the UE successfully, it proves that the UE is UE previously connected to the source base station, and the source base station sends the context of the UE to the target base station.

After the target base station obtains the context of the UE, optionally, the method shown in FIG. 14 may further include the following steps:

S1440. The target base station sends an RRC connection re-establishment message to the UE based on an RRC connection re-establishment request message, or the target base station sends an RRC connection resume message to the UE based on an RRC connection resume request message.

S1450. The UE sends an RRC connection establishment complete message to the target base station based on the RRC connection re-establishment message, or the UE sends an RRC connection resume complete message to the target base station based on the RRC connection resume message.

Then, the RRC connection re-establishment or the RRC connection resumption completes.

Optionally, the method may further include: receiving, by the UE, offset indication information, where the offset indication information is used to indicate a cell signal quality offset. The cell signal quality offset is used by the UE to trigger a radio link failure or connected mode cell reselection. Specifically, if signal quality of a serving cell is lower than a threshold, and signal quality of a neighboring cell is higher than that of the current serving cell and the cell signal quality offset, the UE performs connected mode cell reselection or triggers the RLF. The UE may further receive threshold information. The threshold information is used to indicate an indication threshold. When the signal quality of the serving cell is lower than the indication threshold, and the signal quality of the neighboring cell is higher than that of the current serving cell and the cell signal quality offset, the UE performs connected mode cell reselection or triggers the RLF.

Specifically, the offset indication information may be carried in the RRC connection re-establishment message sent by the target base station or carried in the RRC connection establishment message sent by the source base station. In addition, the offset indication information may alternatively be carried in another downlink RRC message such as an RRC connection reconfiguration message or an RRC connection release message. This is not specially limited in this embodiment of the present invention.

Figure 15:
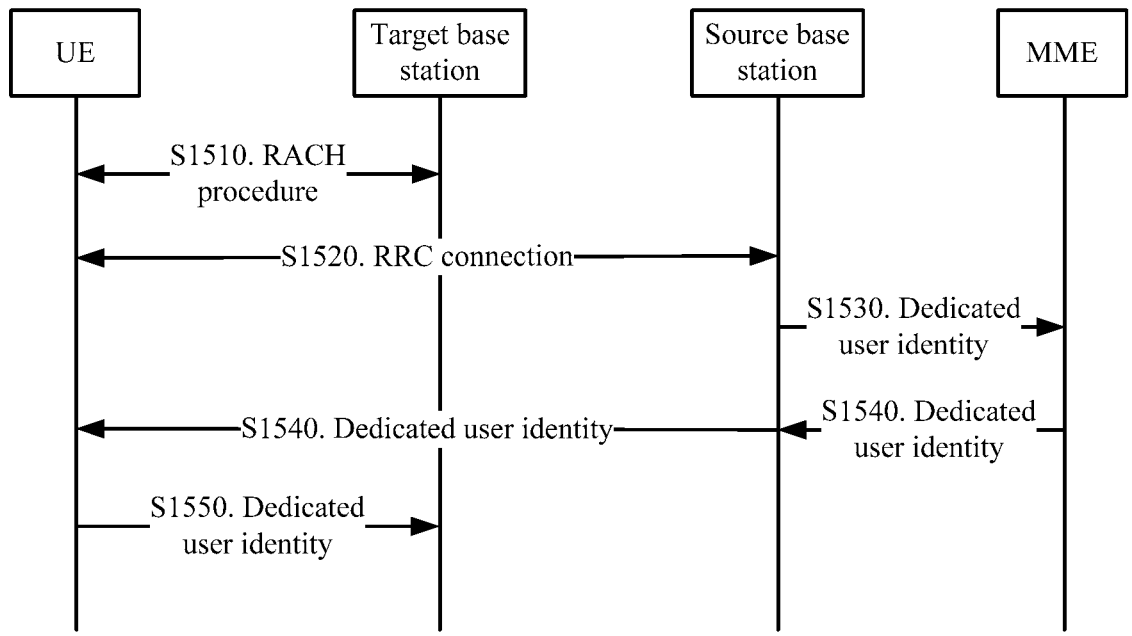
FIG. 15 is a schematic flowchart of an RRC connection method according to an embodiment of the present invention.

An embodiment of the present invention further discloses user equipment 1, configured to perform the methods performed by the UE in the embodiments shown in FIG. 14 and FIG. 15. Specifically, the user equipment 1 may include units configured to perform the methods performed by the UE in the embodiments shown in FIG. 14 and FIG. 15.

An embodiment of the present invention further discloses a target base station 1, configured to perform the methods performed by the target base station in the embodiments shown in FIG. 14 and FIG. 15. Specifically, the target base station 1 may include units configured to perform the methods performed by the target base station in the embodiments shown in FIG. 14 and FIG. 15.

An embodiment of the present invention further discloses a source base station 1, configured to perform the methods performed by the source base station in the embodiments shown in FIG. 14 and FIG. 15. Specifically, the source base station 1 may include units configured to perform the methods performed by the source base station in the embodiments shown in FIG. 14 and FIG. 15.

Figure 16:
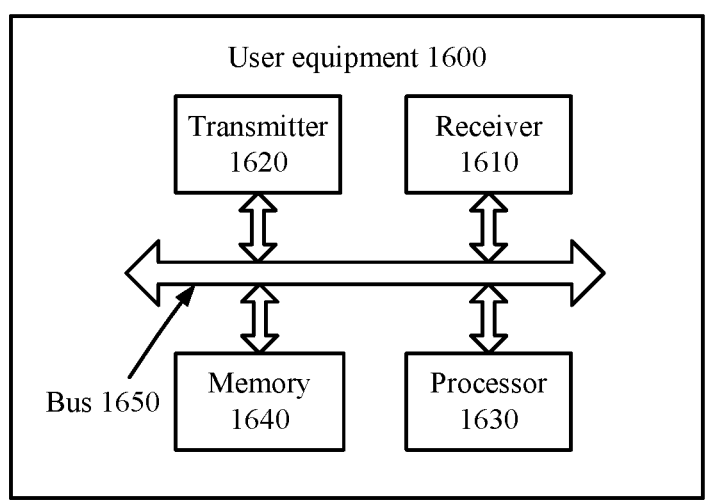
FIG. 16 is a schematic structural diagram of user equipment 1600 according to an embodiment of the present invention.

An embodiment of the present invention further proposes user equipment 2. A schematic structural diagram of a physical apparatus of the user equipment 2 may be shown by using a physical apparatus 1600 in FIG. 16, including a processor 1630, a memory 1640, a transmitter 1620, and a receiver 1610.

The receiver 1610, the transmitter 1620, the processor 1630, and the memory 1640 are connected by using a bus 1650. The bus 1650 may be an ISA bus, a PCI bus, an EISA bus, or the like. The bus may be classified into an address bus, a data bus, a control bus, and the like. For ease of representation, the bus is represented by using only one double-headed arrow in FIG. 16. However, it does not mean that there is only one bus or only one type of bus. In specific application, the transmitter 1620 and the receiver 1610 may be coupled to an antenna.

The memory 1640 is configured to store a program. Specifically, the program may include program code, and the program code includes a computer operation instruction. The memory 1640 may include a read-only memory and a random access memory, and provide an instruction and data to the processor 1630. The memory 1640 may include a high-speed RAM memory, or may include a non-volatile memory, such as at least one disk storage.

The processor 1630 executes the program stored in the memory 1640.

Specifically, in the user equipment 2, the processor 1630 may be configured to perform the methods in the embodiments shown in FIG. 14 and FIG. 15, and implement functions of the UE in the embodiments shown in FIG. 14 and FIG. 15.

The processor 1630 may be an integrated circuit chip, and has a signal processing capability. In an implementation process, steps in the foregoing methods can be implemented by using a hardware integrated logical circuit in the processor 1630, or by using instructions in a form of software. The processor 1630 may be a general-purpose processor, including a central processing unit (CPU), a network processor (NP), and the like; or may be further a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and completed by using a hardware decoding processor, or may be executed and completed by using a combination of hardware in the decoding processor and software modules. The software module may be located in a mature storage medium in the art, such as a random access memory, a flash memory, a read-only memory, a programmable read-only memory, an electrically erasable programmable memory, or a register. The storage medium is located in the memory 1640, and the processor 1630 reads information in the memory 1640 and completes the steps in the foregoing methods in combination with hardware of the processor.

An embodiment of the present invention further proposes a target base station 2. A schematic structural diagram of a physical apparatus of the target base station 2 may be shown in FIG. 16, and physical units included in the target base station 2 are similar to those in the user equipment 2. Details are not described again.

Specifically, in the target base station 2, the processor 1630 may be configured to perform the methods in the embodiments shown in FIG. 14 and FIG. 15, and implement functions of the target base station in the embodiments shown in FIG. 14 and FIG. 15.

An embodiment of the present invention further proposes a source base station 2. A schematic structural diagram of a physical apparatus of the source base station 2 may be shown in FIG. 16, and physical units included in the source base station 2 are similar to those in the user equipment 2. Details are not described again.

Specifically, in the source base station 2, the processor 1630 may be configured to perform the methods in the embodiments shown in FIG. 14 and FIG. 15, and implement functions of the source base station in the embodiments shown in FIG. 14 and FIG. 15.

Figure 17:
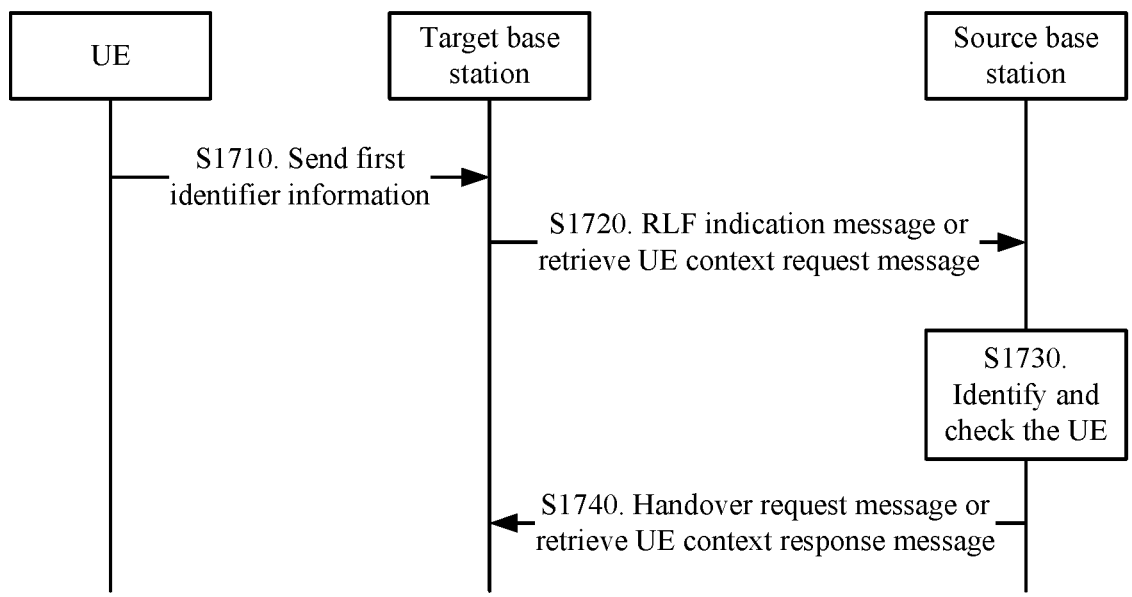
FIG. 17 is a schematic flowchart of an RRC connection method according to an embodiment of the present invention.

FIG. 17 shows another radio resource control RRC connection method. It should be understood that, for terms and words described in the following that are the same as those in the foregoing, and steps or operations described in the following that are the same as or have same functions as those in the foregoing, reference may be made to the related descriptions of the methods shown in FIG. 14 and FIG. 15. In addition, for implementations of related steps in the following, reference may also be made to the related descriptions of the methods shown in FIG. 14 and FIG. 15. For brevity, details are not described again in the following.

S1710. UE sends first identifier information to a target base station, where the first identifier information is used to indicate that the UE uses a control plane CP scheme to establish an RRC connection, or is used to identify or check the UE.

The UE may use the CP scheme to re-establish or resume the RRC connection to the target base station. According to the RRC connection method in this embodiment of the present invention, when the CP scheme is used to re-establish or resume the RRC connection, the target base station can obtain a context of the UE from a source base station by using the first identifier information, and establish the RRC connection to the UE.

In this embodiment of the present invention, the UE may send establishment indication information to the target base station by using an RRC connection re-establishment request message, an RRC connection resume request message, or an RRC connection establishment request message. In other words, the RRC connection re-establishment request message, the RRC connection resume request message, and the RRC connection establishment request message may all carry the establishment indication information.

In addition, the RRC connection re-establishment request message or the RRC connection resume request message may further include parameters such as a cell radio network temporary identifier (C-RNTI) and a PCI.

S1720. The target base station sends an RLF indication message or a retrieve UE context request message (Retrieve UE context request) to a source base station, where the RLF indication message or the retrieve UE context request message includes the first identifier information. It should be understood that the RLF indication message or the retrieve UE context request message is used to request the context of the UE.

S1730. The source base station identifies and checks the UE based on the first identifier information.

Specifically, the source base station may determine, based on the first indication information in the RLF indication message or the retrieve UE context response message sent by the target base station, that the UE uses the CP scheme to establish the RRC connection. After determining that the UE uses the CP scheme to establish the RRC connection, the source base station identifies and checks the UE based on the first identifier information. If the source base station can identify the UE and check the UE successfully, the source base station sends a handover request message or a retrieve UE context response message to the target base station, and sends the context of the UE to the UE.

The source base station identifies or checks the UE based on the first identifier information. For details, refer to the foregoing descriptions. For brevity, details are not described herein again.

S1740. The source base station sends a handover request message to the target base station based on the RLF indication message, or the source base station sends a retrieve UE context response message to the target base station based on the retrieve UE context request message.

In this embodiment of the present invention, the first identifier information may include a dedicated user identity, and the UE needs to obtain the dedicated user identity before sending the dedicated user identity to the target base station. In this embodiment, the UE may obtain the dedicated user identity by using the method shown in FIG. 15. For brevity, details are not described herein again.

In addition, after the target base station obtains the context of the UE, the method may further include steps S1650 and S1660 shown in FIG. 14. For brevity, details are not described herein again.

Optionally, the method may further include: receiving, by the UE, offset indication information, where the offset indication information is used to indicate a cell signal quality offset. The cell signal quality offset is used by the UE to trigger a radio link failure or connected mode cell reselection. To be specific, when signal quality of a serving cell is lower than a threshold, and signal quality of a neighboring cell is higher than that of the current serving cell and the cell signal quality offset, the UE performs connected mode cell reselection or triggers the RLF.

Specifically, the offset indication information may be carried in the RRC connection re-establishment message sent by the target base station or carried in the RRC connection establishment message sent by the source base station. In addition, the offset indication information may alternatively be carried in another downlink RRC message such as an RRC connection reconfiguration message or an RRC connection release message. This is not specially limited in this embodiment of the present invention.

An embodiment of the present invention further discloses user equipment 3, configured to perform the method performed by the UE in the embodiment shown in FIG. 17. Specifically, the user equipment 3 may include units configured to perform the method performed by the UE in the embodiment shown in FIG. 17.

An embodiment of the present invention further discloses a target base station 3, configured to perform the method performed by the target base station in the embodiment shown in FIG. 17. Specifically, the target base station 3 may include units configured to perform the method performed by the target base station in the embodiment shown in FIG. 17.

An embodiment of the present invention further discloses a source base station 3, configured to perform the method performed by the source base station in the embodiment shown in FIG. 17. Specifically, the source base station 3 may include units configured to perform the method performed by the source base station in the embodiment shown in FIG. 17.

Figure 18:
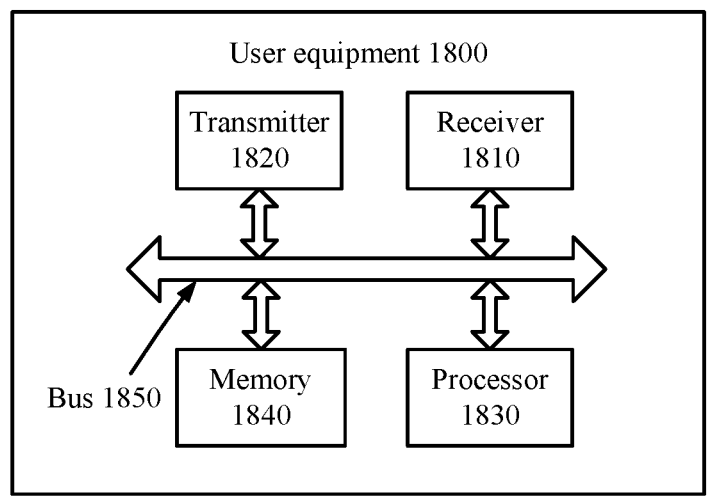
FIG. 18 is a schematic structural diagram of user equipment 1800 according to an embodiment of the present invention.

An embodiment of the present invention further proposes user equipment 4. A schematic structural diagram of a physical apparatus of the user equipment 4 may be shown by using a physical apparatus 1800 in FIG. 18, including a processor 1830, a memory 1840, a transmitter 1820, and a receiver 1810.

The receiver 1810, the transmitter 1820, the processor 1830, and the memory 1840 are connected by using a bus 1850. The bus 1850 may be an ISA bus, a PCI bus, an EISA bus, or the like. The bus may be classified into an address bus, a data bus, a control bus, and the like. For ease of representation, the bus is represented by using only one double-headed arrow in FIG. 18. However, it does not mean that there is only one bus or only one type of bus. In specific application, the transmitter 1820 and the receiver 1810 may be coupled to an antenna.

The memory 1840 is configured to store a program. Specifically, the program may include program code, and the program code includes a computer operation instruction. The memory 1840 may include a read-only memory and a random access memory, and provide an instruction and data to the processor 1830. The memory 1840 may include a high-speed RAM memory, or may further include a non-volatile memory, such as at least one disk storage.

The processor 1830 executes the program stored in the memory 1840.

Specifically, in the user equipment 4, the processor 1830 may be configured to perform the method in the embodiment shown in FIG. 17, and implement functions of the UE in the embodiment shown in FIG. 17.

The processor 1830 may be an integrated circuit chip, and has a signal processing capability. In an implementation process, steps in the foregoing methods can be implemented by using a hardware integrated logical circuit in the processor 1830, or by using instructions in a form of software. The processor 1830 may be a general-purpose processor, including a central processing unit (CPU), a network processor (NP), and the like; or may be further a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and completed by using a hardware decoding processor, or may be executed and completed by using a combination of hardware in the decoding processor and software modules. The software module may be located in a mature storage medium in the art, such as a random access memory, a flash memory, a read-only memory, a programmable read-only memory, an electrically erasable programmable memory, or a register. The storage medium is located in the memory 1840, and the processor 1830 reads information in the memory 1840 and completes the steps in the foregoing methods in combination with hardware of the processor.

An embodiment of the present invention further proposes a target base station 4. A schematic structural diagram of a physical apparatus of the target base station 4 may be shown in FIG. 18, and physical units included in the target base station 4 are similar to those in the user equipment 4. Details are not described again.

Specifically, in the target base station 4, the processor 1830 may be configured to perform the method in the embodiment shown in FIG. 17, and implement functions of the target base station in the embodiment shown in FIG. 17.

An embodiment of the present invention further proposes a source base station 4. A schematic structural diagram of a physical apparatus of the source base station 4 may be shown in FIG. 18, and physical units included in the source base station 4 are similar to those in the user equipment 4. Details are not described again.

Specifically, in the source base station 4, the processor 1830 may be configured to perform the method in the embodiment shown in FIG. 17, and implement functions of the source base station in the embodiment shown in FIG. 17.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for a convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes a medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An information transmission method, comprising:
obtaining, by a positioning center, coverage indication information, wherein the coverage indication information indicates that a user equipment (UE) is at a coverage enhancement level;
in response to the coverage indication information indicating that the UE is at the coverage enhancement level, determining, by the positioning center according to the coverage indication information, positioning measurement configuration information, wherein the positioning measurement configuration information comprises a quantity of to-be-measured cells, and wherein the quantity of to-be-measured cells is used to limit a maximum quantity of to-be-measured cells; and
sending, by the positioning center, the positioning measurement configuration information to the UE, wherein the positioning measurement configuration information is used to perform positioning measurement configuration on the UE.

2. The method according to claim 1, wherein the obtaining, by a positioning center, coverage indication information comprises:
receiving, by the positioning center, the coverage indication information from a core network device.

3. The method according to claim 2, wherein the receiving, by the positioning center, coverage indication information from the core network device comprises:
receiving, by the positioning center, a location service request message from the core network device, wherein the location service request message comprises the coverage indication information.

4. The method according to claim 1, wherein the positioning measurement configuration information comprises the following information about the UE:
to-be-measured frequency information.

5. The method according to claim 1, wherein the coverage enhancement level is higher than a pre-determined coverage enhancement level.

6. An information transmission method, comprising:
receiving, by a core network device, coverage indication information from a base station, wherein the coverage indication information indicates that a user equipment (UE) is at a coverage enhancement level;
in response to the coverage indication information indicating that the UE is at the coverage enhancement level, sending, by the core network device, the coverage indication information to a positioning center;
obtaining, by the positioning center, the coverage indication information;
determining, by the positioning center according to the coverage indication information, positioning measurement configuration information, wherein the positioning measurement configuration information comprises a quantity of to-be-measured cells, and wherein the quantity of to-be-measured cells is used to limit a maximum quantity of to-be-measured cells; and
sending, by the positioning center, the positioning measurement configuration information to the UE, wherein the positioning measurement configuration information is used to perform positioning measurement configuration on the UE.

7. The method according to claim 6, wherein the receiving, by a core network device, coverage indication information from a base station comprises:
receiving, by the core network device, an initial UE message or a UE context resume request message from the base station, wherein the initial UE message or the UE context resume request message comprises the coverage indication information.

8. The method according to claim 6, wherein the sending, by the core network device, the coverage indication information to a positioning center comprises:
sending, by the core network device, a location service request message to the positioning center, wherein the location service request message comprises the coverage indication information.

9. The method according to claim 6, wherein the positioning measurement configuration information comprises the following information about the UE:
to-be-measured frequency information.

10. A positioning center, comprising:
at least one processor, the at least one processor configured to obtain coverage indication information, wherein the coverage indication information indicates that a user equipment (UE) is at a coverage enhancement level;

the at least one processor further configured to determine, according to the coverage indication information indicating that the UE is at the coverage enhancement level, positioning measurement configuration information, wherein the positioning measurement configuration information comprises a quantity of to-be-measured cells, and wherein the quantity of to-be-measured cells is used to limit a maximum quantity of to-be-measured cells; and a transmitter, the transmitter configured to send the positioning measurement configuration information to the UE, wherein the positioning measurement configuration information is used to perform positioning measurement configuration on the UE.

11. The positioning center according to claim 10, wherein the positioning center further comprises:
 a receiver, the receiver configured to receive the coverage indication information from a core network device.

12. The positioning center according to claim 11, wherein the receiver is configured to:
 receive a location service request message from the core network device, wherein the location service request message comprises the coverage indication information.

13. The positioning center according to claim 10, wherein the coverage enhancement level is higher than a pre-determined coverage enhancement level.

14. The positioning center according to claim 10, wherein the positioning measurement configuration information comprises the following information about the UE:
 to-be-measured frequency information.

15. A system for information transmission, comprising a core network device and a positioning center, wherein:

the core network device is configured to:
 receive coverage indication information from a base station, wherein the coverage indication information indicates that a user equipment (UE) is at a coverage enhancement level; and
 in response to the coverage indication information indicating that the UE is at the coverage enhancement level, send the coverage indication information to the positioning center; and the positioning center is configured to:
 obtain the coverage indication information;
 determine positioning measurement configuration information according to the coverage indication information, wherein the positioning measurement configuration information comprises a quantity of to-be-measured cells, and wherein the quantity of to-be-measured cells is used to limit a maximum quantity of to-be-measured cells; and
 send the positioning measurement configuration information to the UE, wherein the positioning measurement configuration information is used to perform positioning measurement configuration on the UE.

16. The system according to claim 15, wherein the core network device is configured to:
 receive an initial UE message or a UE context resume request message sent by the base station, wherein the initial UE message or the UE context resume request message comprises the coverage indication information.

17. The system according to claim 15, wherein the core network device is configured to:
 send a location service request message to the positioning center, wherein the location service request message comprises the coverage indication information.

18. The system according to claim 15, wherein the positioning measurement configuration information comprises the following information about the UE:
 to-be-measured frequency information.

* * * * *